United States Patent
Hayashi et al.

(10) Patent No.: US 11,439,903 B2
(45) Date of Patent: Sep. 13, 2022

(54) INFORMATION PROCESSING SYSTEM, STORAGE MEDIUM STORING INFORMATION PROCESSING PROGRAM, INFORMATION PROCESSING APPARATUS, AND INFORMATION PROCESSING METHOD

(71) Applicant: NINTENDO CO., LTD., Kyoto (JP)

(72) Inventors: Yugo Hayashi, Kyoto (JP); Miyuki Kimura, Kyoto (JP); Shinya Fujiwara, Kyoto (JP); Kyosuke Shimokawa, Kyoto (JP); Hiroaki Tamura, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 370 days.

(21) Appl. No.: 16/722,547

(22) Filed: Dec. 20, 2019

(65) Prior Publication Data
US 2020/0206620 A1 Jul. 2, 2020

(30) Foreign Application Priority Data
Dec. 26, 2018 (JP) .............................. JP2018-242843

(51) Int. Cl.
*A63F 13/46* (2014.01)
*A63F 13/56* (2014.01)
*A63F 13/803* (2014.01)
*A63F 13/67* (2014.01)
*A63F 13/69* (2014.01)
*A63F 13/58* (2014.01)

(52) U.S. Cl.
CPC .............. *A63F 13/46* (2014.09); *A63F 13/56* (2014.09); *A63F 13/58* (2014.09); *A63F 13/67* (2014.09); *A63F 13/69* (2014.09); *A63F 13/803* (2014.09)

(58) Field of Classification Search
None
See application file for complete search history.

(56) References Cited

U.S. PATENT DOCUMENTS

| | | | |
|---|---|---|---|
| 5,112,051 A * | 5/1992 | Darling | A63F 13/02 711/115 |
| 10,086,261 B1 * | 10/2018 | Kim | A63F 13/57 |
| 2002/0169013 A1 * | 11/2002 | Serizawa | A63F 13/12 463/6 |

(Continued)

OTHER PUBLICATIONS

InBetweenGamer, Mario Kart 8—Full Game Complete Gameplay Playthrough [1080p HD], May 30, 2014, https://www.youtube.com/watch?v=BR0I84gjEXg , p. 1 (time 0:00-2:01) (Year: 2014).*

(Continued)

*Primary Examiner* — Tramar Harper
(74) *Attorney, Agent, or Firm* — Nixon & Vanderhye P.C.

(57) ABSTRACT

An in-game event occurring based on a user's input is detected in a game of each time, where the game is performed a plurality of times. A first parameter is increased or decreased based on the in-game event occurring in the game of each time, the first parameter being reset for the game of each time, to calculate a score in the game of each time. A second parameter is increased or decreased based on a result of the game determined based on an assessment parameter different from a final score, the second parameter being used in the game of the plurality of times without being reset for the game of each time.

19 Claims, 11 Drawing Sheets

(56) References Cited

U.S. PATENT DOCUMENTS

| | | | | |
|---|---|---|---|---|
| 2003/0054869 | A1* | 3/2003 | Hightower | A63F 13/10 |
| | | | | 463/6 |
| 2005/0096110 | A1* | 5/2005 | Ohyagi | A63F 13/56 |
| | | | | 463/6 |
| 2007/0004482 | A1* | 1/2007 | Ando | A63F 13/48 |
| | | | | 463/6 |
| 2007/0149285 | A1* | 6/2007 | Osnato | A63F 13/98 |
| | | | | 463/37 |
| 2007/0265074 | A1* | 11/2007 | Akahori | A63F 13/245 |
| | | | | 463/35 |
| 2008/0167122 | A1* | 7/2008 | Maeda | A63F 13/577 |
| | | | | 463/30 |
| 2009/0093313 | A1* | 4/2009 | Yabuki | A63F 13/803 |
| | | | | 463/43 |
| 2011/0201395 | A1* | 8/2011 | Bansi | A63F 13/5375 |
| | | | | 463/6 |

OTHER PUBLICATIONS

"Excite Track", [online], Nintendo of America Inc., searched on Nov. 30, 2018 (Heisei 30), 7 pages, URL:https://www.nintendo.com/consumer/gamelist/manuals/Wii_Excite_Truck.pdf.

* cited by examiner

FIG. 8

```
         AAA CUP
          100cc
       MOUNTAIN COURSE
BASE POINTS
   (icon)   (icon)   (icon)    81
    57       14       10
STANDING POINTS
   1st                        120
ACTION POINTS
   HITTING ITEM                10
   HITTING ITEM                10
   HITTING ITEM (IN FEVER STATE) 100
   MAINTAINING LEAD            36
   JUMPING ACTION               6
   MINI-TURBO (LV2)             3
                              165
SCORE
                              366
```

35

INFORMATION PROCESSING SYSTEM, STORAGE MEDIUM STORING INFORMATION PROCESSING PROGRAM, INFORMATION PROCESSING APPARATUS, AND INFORMATION PROCESSING METHOD

CROSS REFERENCE TO RELATED APPLICATIONS

The disclosure of Japanese Patent Application No. 2018-242843, filed Dec. 26, 2018, is incorporated herein by reference.

FIELD

The technology disclosed herein relates to information processing systems, storage media storing information processing programs, information processing apparatuses, and information processing methods. More particularly, the technology disclosed herein relates to information processing systems, storage media storing information processing programs, information processing apparatuses, and information processing methods for performing a process based on a user's input.

BACKGROUND AND SUMMARY

In conventional racing games in which an object (e.g., a racing car) controlled according to a user's input participates, a final game score is determined, taking into account points based on the standing of the object in a race, and points based on a trick that has been performed by the object in the race.

However, in the above games, there is room for improvement of a motivation for a great achievement in the racing game.

With the above in mind, it is an object of this non-limiting example to provide an information processing system, storage medium storing an information processing program, information processing apparatus, and information processing method in which a motivation for a great achievement in a game is increased.

To achieve the above, this non-limiting example has the following features, for example. It should be understood that the scope of the present technology is defined only by the appended claims. To the extent of any inconsistency or conflict in disclosure between the description and the claims appended hereto, the claims shall prevail.

A non-limiting example configuration of an information processing system according to this non-limiting example calculates a score in a game based on a user's input, the game being performed a plurality of times. The information processing system includes a computer that executes: detecting an in-game event occurring based on the user's input in the game of each time; increasing or decreasing a first parameter based on the in-game event occurring in the game of each time, the first parameter being reset for the game of each time; calculating the score in the game of each time; determining a reward to be given to the user, based on a final score that is the score at the end of the game of each time; and increasing or decreasing a second parameter based on a result of the game determined based on an assessment parameter different from the final score, the second parameter being used in the game of the plurality of times without being reset for the game of each time. The score is calculated based on the first and second parameters.

With the above configuration, a score with reference to which a reward to be given is calculated using a second parameter that is increased or decreased based on an assessment parameter different from the score, and is not reset each time a game is performed. Therefore, a motivation for a great achievement in both of the score and the assessment parameter can be increased.

In addition, the increasing or decreasing the second parameter may include managing a base parameter for each in-game object usable by the user, and calculating the second parameter based on the base parameter corresponding to a use object that is an in-game object used by the user in the racing game.

With the above configuration, the second parameter is calculated based on the base parameter set for each in-game object that has been used, and therefore, a strategy for selecting an in-game object is provided.

In addition, the increasing or decreasing the second parameter may include increasing or decreasing the base parameter corresponding to the use object used in the game, based on the result of the game.

With the above configuration, the base parameter of an in-game object that has been used is increased or decreased based on the result of the game, and therefore, the strategic aspect of selecting an in-game object can be improved.

In addition, the increasing or decreasing the second parameter may include, when there are a plurality of the use objects used in the game, increasing or decreasing a plurality of the base parameters corresponding to the plurality of use objects, based on the result of the game.

With the above configuration, the strategic aspect of using a combination of in-game objects can be improved.

In addition, the increasing or decreasing the first parameter may include, when the use object used by the user in the game satisfies a first increase or decrease condition, increasing the absolute value of a value by which the first parameter is to be increased or decreased based on the in-game event.

With the above configuration, the absolute value of a value by which the first parameter is to be increased or decreased based on the in-game event, is increased, and therefore, the strategic aspect of selecting an in-game object can be improved.

In addition, the computer may further execute, when the user has obtained a required number of the in-game objects of the same kind, changing the in-game object so that the first increase or decrease condition is satisfied.

With the above configuration, the absolute value by which the first parameter is increased or decreased is increased according to the number of obtained in-game objects, and therefore, the necessity of obtaining an in-game object can be provided.

In addition, the increasing or decreasing the first parameter may include calculating a value by which the first parameter is to be increased or decreased based on a value determined for each in-game event and a parameter corresponding to the use object, only during the time the second increase or decrease condition is satisfied in the game.

With the above configuration, a motivation for satisfying the second increase or decrease condition in the game can be provided, and a strategy for generating an in-game event during the time that the second increase or decrease condition is satisfied, can be provided.

In addition, in the increasing or decreasing the first parameter, the second increase or decrease condition may be satisfied when the use object is combined with a particular stage of the game.

With the above configuration, a strategy for selecting a use object suitable for a stage of the game can be provided.

In addition, in the increasing or decreasing the second parameter, a rate value that is increased or decreased according to the result of the game, may be used as the second parameter.

With the above configuration, the score can be calculated using the degree of proficiency of the user in the game.

In addition, the score may be calculated based on the first parameter and a value calculated using both of the rate value and the assessment parameter.

With the above configuration, the score is calculated using a value obtained using not only the rate value that is increased or decreased according to the result of the game, but also a value corresponding to the assessment parameter for use in determination of the result of the game, and the first parameter. Therefore, a novel kind of score can be calculated.

In addition, the score may be calculated based on the first parameter and a value corresponding to the second parameter and the difficulty of the game.

With the above configuration, the score can be increased or decreased according to the difficulty of the game.

In addition, the score may be calculated based on a value obtained by multiplying the second parameter by at least one of a value corresponding to the assessment parameter or a value corresponding to the difficulty of the game.

With the above configuration, the score can be increased or decreased according to the difficulty of the game.

In addition, the game may be a competitive game. The increasing or decreasing the first parameter may include increasing or decreasing the first parameter in response to occurrence of the in-game event in which a standing or higher standings is maintained for a period of time.

With the above configuration, the score is increased or decreased according to a standing in the middle of the game, and therefore, it is necessary to play the game, taking into account not only the final position in standings but also an in-game event in the middle of the game.

In addition, the game may be a competitive game. The increasing or decreasing the first parameter may include increasing or decreasing the first parameter in response to occurrence of the in-game event in which the user obstructs the opponent.

With the above configuration, the score can be increased or decreased by obstructing an opponent.

In addition, the increasing or decreasing the first parameter may include increasing or decreasing the first parameter in response to occurrence of the in-game event in which the user is put at a disadvantage in the game.

With the above configuration, the score can be increased or decreased even in a situation that the user is put at a disadvantage in the game.

In addition, the increasing or decreasing the first parameter may include increasing or decreasing the first parameter in response to occurrence of the in-game event in which the user destroys a disposed object disposed in a game space.

With the above configuration, the score can be increased or decreased by destroying a disposed object.

In addition, an action based on the user's input may be detected as the in-game event. The increasing or decreasing the first parameter may include changing the amount of an increase or decrease in the first parameter, depending on the degree of an achievement of the action.

With the above configuration, the score can be increased or decreased, depending on the level or quality of an in-game event in the game.

In addition, the increasing or decreasing the first parameter may include increasing or decreasing the first parameter by adding, to the first parameter, a value based on a value obtained by multiplying a value determined for each in-game event by the second parameter.

With the above configuration, the first parameter can be calculated, significantly based on the previous game results.

In addition, the game may be a racing game. The increasing or decreasing the second parameter may include determining the result of the game based on a standing in which the user has reached a finish in the race, the standing being the assessment parameter.

With the above configuration, the second parameter can be calculated based on a standing in a racing game.

This non-limiting example may be carried out in the form of a storage medium storing a computer-readable storage medium storing an information processing program, an information processing apparatus, and an information processing method.

According to this non-limiting example, a motivation for a great achievement in a game is increased.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 8 is a diagram showing a fifth non-limiting example game image displayed on the display unit 35 of the information processing apparatus 3.

DETAILED DESCRIPTION OF NON-LIMITING EXAMPLE EMBODIMENTS

Figure 1:
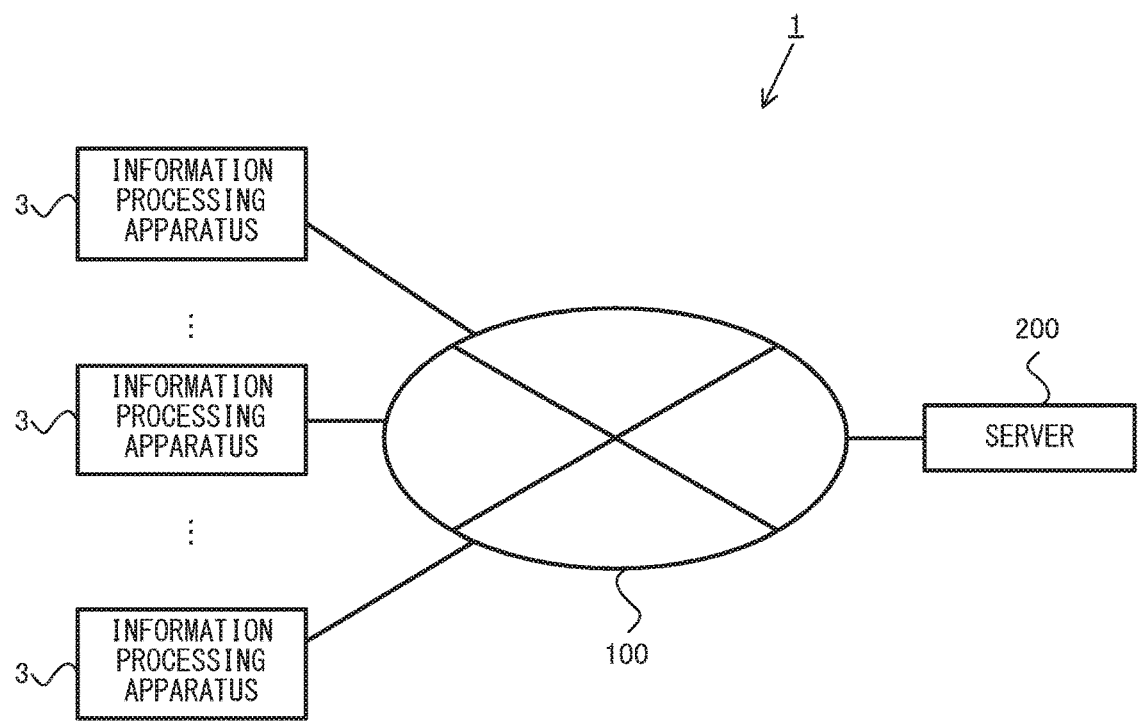
FIG. 1 is a diagram showing a non-limiting example of an information processing system 1 according to this non-limiting example.

An information processing system according to a non-limiting example embodiment will be described with reference to FIG. 1. As shown in FIG. 1, an information processing system 1 that is a non-limiting example of the information processing system of this non-limiting example, includes information processing apparatuses 3 and a server 200, which are connected together through a network 100. Although FIG. 1 shows a plurality of information processing apparatuses 3, the information processing system 1 may include only a single information processing apparatus 3.

The information processing apparatuses 3 are configured to be able to connect to the network 100 through wireless or wired communication. The information processing apparatuses 3 and the server 200 constitute a client-server system. For example, the information processing apparatuses 3 can execute a predetermined application (e.g., a game application, etc.). The information processing apparatuses 3 can connect to and communicate with the server 200 through the network 100 by executing the above predetermined application. For example, the information processing apparatuses 3 can execute an information processing program that is stored in a replaceable storage medium, such as a memory card or an optical disc, or is received from another apparatus. The information processing apparatuses 3 may be a typical personal computer, stationary game machine, mobile telephone, handheld game console, personal digital assistant (PDA), etc.

Figure 2:
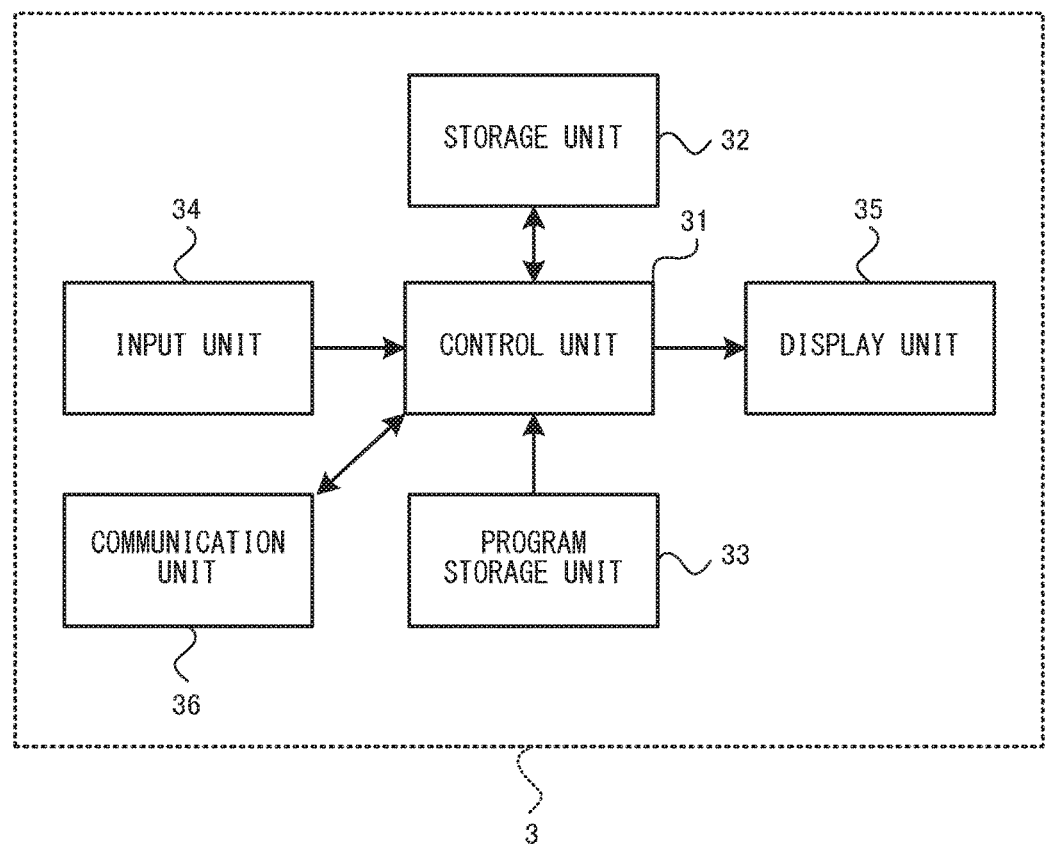
FIG. 2 is a block diagram showing a non-limiting example configuration of an information processing apparatus 3.

Next, the information processing apparatus 3 will be described with reference to FIG. 2. FIG. 2 is a block diagram showing a non-limiting example configuration of the information processing apparatus 3. In FIG. 2, the information processing apparatus 3 includes a control unit 31, a storage unit 32, a program storage unit 33, an input unit 34, a display unit 35, and a communication unit 36. It should be noted that the information processing apparatus 3 may include one or more devices including an information processing device including at least the control unit 31, and other devices.

The control unit 31 is an information processing means (computer) for executing various information processes, such as a CPU. For example, the control unit 31 has a function of executing the above application to perform information processes such as a game process described below, and data transmission and reception processes through the server 200. This function is performed by the control unit 31 (e.g., a CPU) executing predetermined programs.

The storage unit 32 stores various items of data that are used when the control unit 31 executes the above information processes. The storage unit 32 is, for example, a memory that can be accessed by the control unit 31 (e.g., a CPU).

The program storage unit 33 stores programs. The program storage unit 33 may be any storage device (storage medium) that can be accessed by the control unit 31. For example, the program storage unit 33 may be a storage device that is provided in the information processing device including the control unit 31, or a storage medium that is removably attached to the information processing device including the control unit 31. The program storage unit 33 may be a storage device (e.g., a server, etc.) that is connected to the control unit 31 through a network. The control unit 31 (CPU) may read all or a portion of a game program into the storage unit 32 and execute the read program with appropriate timing.

The input unit 34 is an input device that can be operated by a user. The input unit 34 may be any suitable input device. In a non-limiting example, the input unit 34 may be a touch panel provided on a screen of the display unit 35. For example, the touch panel may be of any type. The touch panel may be either of a type that allows a multi-touch input (e.g., a capacitive type) or of a type that allows a single-touch input (e.g., a resistive type). Note that in the case where the information processing apparatus 3 is a stationary or handheld game machine as described above, the input unit 34 may be a handheld game controller coupled to the stationary or handheld game machine. In this case, the input unit 34 may be an operation unit that is provided on a game controller, such as an operation button, operation key, joystick, or slidepad, or an inertial sensor for detecting an orientation or motion of the game controller itself, or an imaging camera for imaging the game controller itself and surroundings.

The display unit 35 displays an image according to an instruction from the control unit 31. It should be noted that when the information processing apparatus 3 is a stationary game apparatus or a personal computer, the display unit 35 may be separated from the information processing apparatus 3.

The communication unit 36, which is a predetermined communication module, exchanges data with another apparatus (e.g., the server 200) or another information processing apparatus 3 through the network 100.

Figure 3:
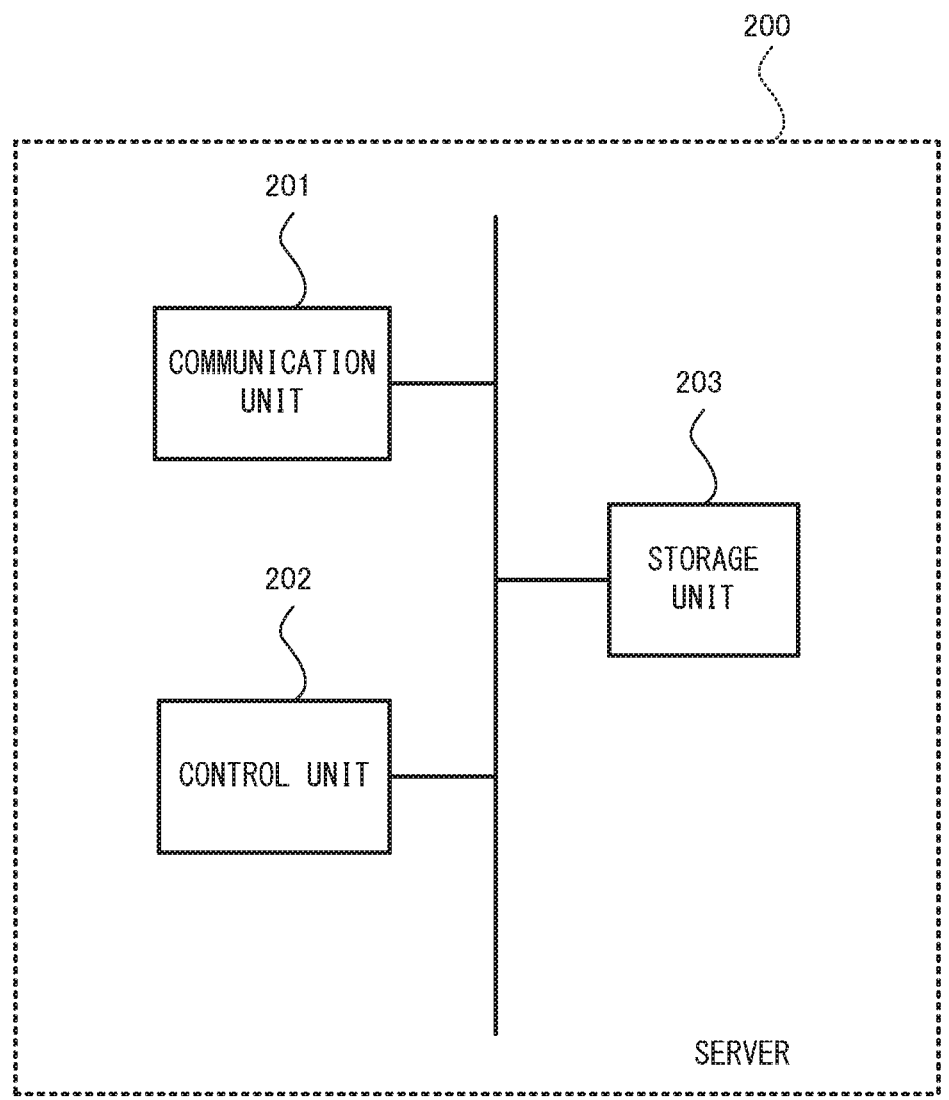
FIG. 3 is a block diagram showing a non-limiting example configuration of a server 200.

Next, the server 200 will be described with reference to FIG. 3. FIG. 3 is a block diagram showing a non-limiting example configuration of the server 200.

The server 200 has a communication unit 201, a control unit 202, and a storage unit 203. The communication unit 201 communicates with the information processing apparatuses 3, etc., through the network 100 by exchanging communication packets. In a non-limiting example, the control unit 202 performs a process of managing the progression of a game performed along with the information processing apparatus 3, a process of managing in-game money (e.g., coins), game items, and game objects (e.g., pieces of equipment used in a game), etc., that are purchased by the user, a process of managing the probability of winning a slot lottery, and a process of managing information about payment or charging. The control unit 202 also establishes a communication link to the information processing apparatuses 3, etc., through the communication unit 201, and performs data transmission control and routing on the network 100. When a game is performed along with a plurality of information processing apparatuses 3, the control unit 202 manages a pairing or grouping of information processing apparatuses 3 that perform the game, and data communication between those information processing apparatuses 3. The storage unit 203 stores programs that are executed by the control unit 202, various items of data used for the above processes, various items of data used for communication with the information processing apparatuses 3, etc. When the system employs a predetermined log-in process for data exchange performed through the network 100, the server 200 may perform an authentication process to determine whether or not a user who tries to log in is an authorized user. The server 200 may be a single server machine or may include a plurality of server machines.

Figure 4:
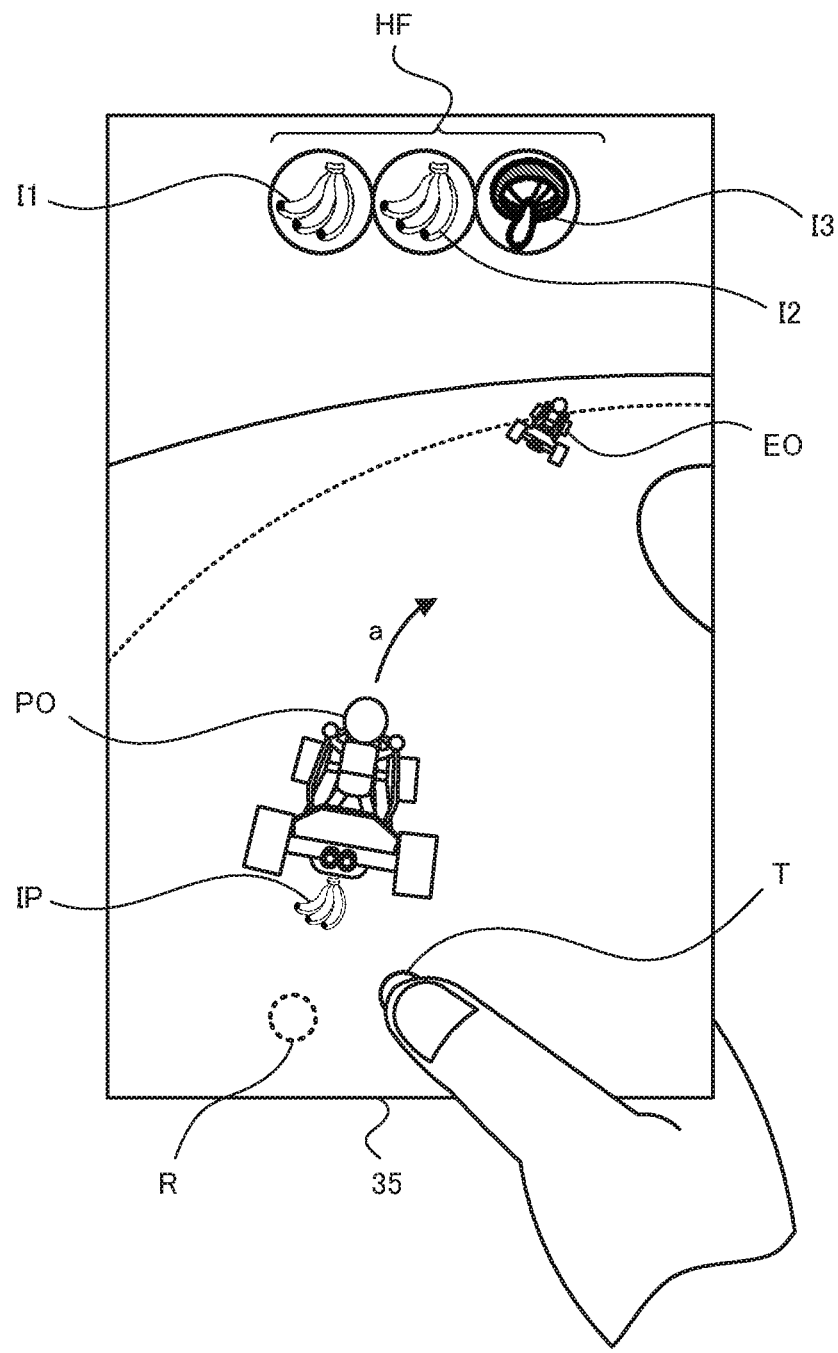
FIG. 4 is a diagram showing a first non-limiting example game image displayed on a display unit 35 of the information processing apparatus 3.
Figure 5:
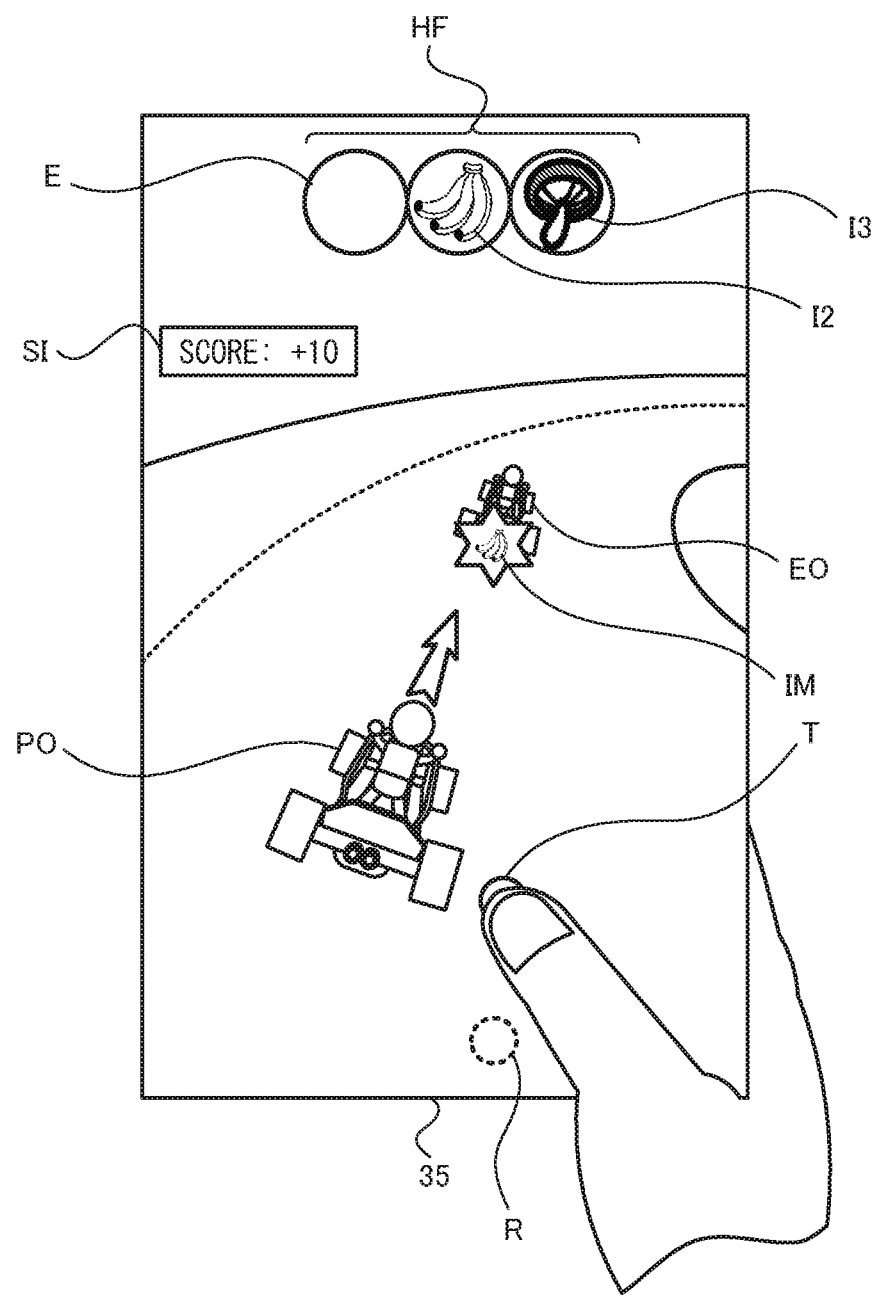
FIG. 5 is a diagram showing a second non-limiting example game image displayed on the display unit 35 of the information processing apparatus 3.
Figure 6:
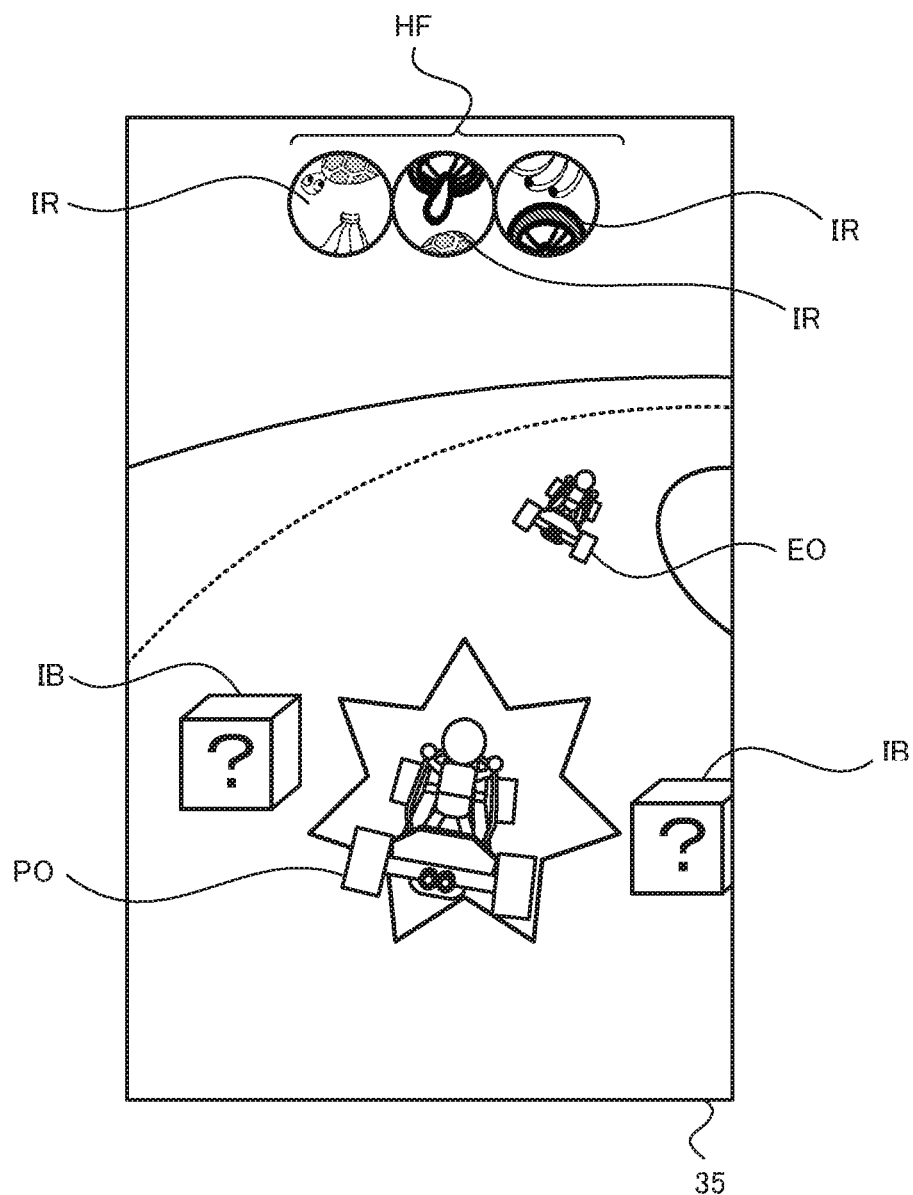
FIG. 6 is a diagram showing a third non-limiting example game image displayed on the display unit 35 of the information processing apparatus 3.
Figure 7:
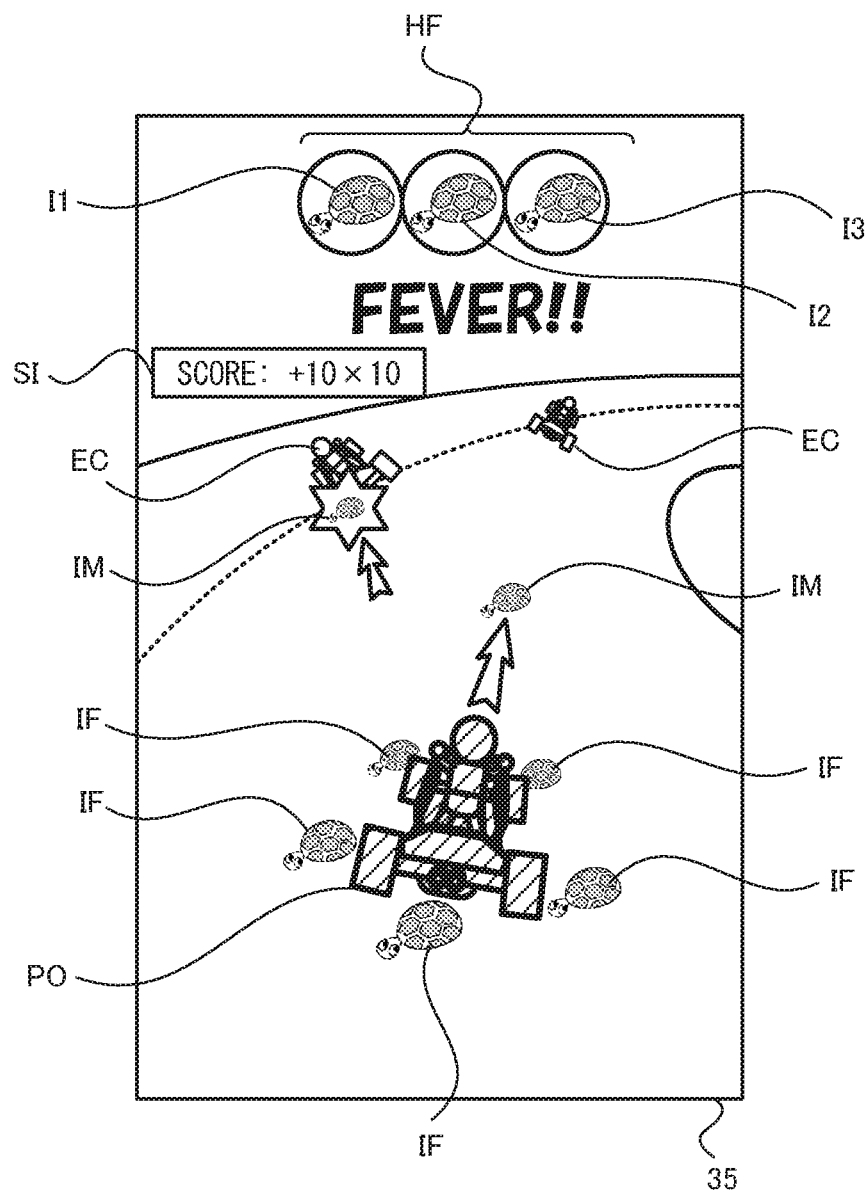
FIG. 7 is a diagram showing a fourth non-limiting example game image displayed on the display unit 35 of the information processing apparatus 3.

Next, before describing specific processes performed by the information processing apparatus 3 and the server 200, a non-limiting example game process performed in the information processing system 1 will be outlined with reference to FIGS. 4-8. Note that FIG. 4 is a diagram showing a first non-limiting example game image displayed on the display unit 35 of the information processing apparatus 3. FIG. 5 is a diagram showing a second non-limiting example game image displayed on the display unit 35 of the information processing apparatus 3. FIG. 6 is a diagram showing a third non-limiting example game image displayed on the display unit 35 of the information processing apparatus 3. FIG. 7 is a diagram showing a fourth non-limiting example game image displayed on the display unit 35 of the information processing apparatus 3. FIG. 8 is a diagram showing a fifth non-limiting example game image displayed on the display unit 35 of the information processing apparatus 3. Although in the description that follows, a game is used as a non-limiting example application executed in the information processing apparatus 3, other applications may be executed in the information processing apparatus 3.

The display unit 35 of the information processing apparatus 3 displays a game image corresponding to a game played in the information processing apparatus 3. In a non-limiting example of such a game image, FIG. 4 shows a scene in which an operation object PO performs a racing game. For example, in the above game, the operation object PO is such that an operation character object sits on a vehicle object (e.g., a machine object (go-kart object) equipped with a kite object for allowing the machine object to glide in the air) and drives the vehicle object on a course provided in a virtual space. Here, the user is allowed to select a combination (configuration) of an operation object PO which is to be operated by the user in a race, before the start of the race. For example, the user is allowed to select a combination of preferred objects from operation character objects, machine objects, and kite objects which are possessed by the user, to configure an operation object PO. On the course, an opponent object(s) EO also sits on and drive another vehicle object. These objects compete to be first to reach a finish provided on the course. A virtual camera for generating a game image is disposed behind the operation object PO traveling on the course, i.e., is moved, following the operation object PO. Note that when the operation object PO deviates from the travel direction of the course due to spinning, drifting, etc., the virtual camera may be still disposed at a position where the operation object PO is seen from behind the operation object PO (i.e., the virtual camera is aimed toward the operation object PO), or may be disposed at a position where the operation object PO is seen from behind along the travel direction of the course (i.e., the virtual camera is aimed in the travel direction of the course).

As shown in FIG. 4, the movement direction of the operation object PO can be controlled by performing an operation of touching the touch panel (a non-limiting example of the input unit 34) provided on the screen of the display unit 35. In a non-limiting example, the operation object PO is controlled to automatically travel forward along the course, and the leftward/rightward movement direction of the operation object PO is controlled by the user's operation (e.g., a steering operation). Specifically, when a touch operation of swiping rightward is performed with reference to the position where the touch panel was first touched (initial touch position), the movement direction of the operation object PO is changed to a rightward direction. When a touch operation of swiping leftward is performed with reference to an initial touch position, the movement direction of the operation object PO is changed to a leftward direction. For example, in FIG. 4, the display unit 35 displays a reference image R showing an initial touch position on the touch panel, and a touch position image T showing a current touch position. Because the touch position image T is located to the right of the reference image R, the movement direction of the operation object PO is changed to a rightward direction (direction "a" in FIG. 4). Note that the operation object PO may not be controlled to automatically travel forward along the course, and may be caused to travel according to the user's acceleration operation. The operation object PO may also be controlled to be automatically steered to turn left and right along the course. For example, when the course curves to the right, the movement direction of the operation object PO may be changed to a rightward direction to some extent even without the user's steering operation, and in this case, when the user performs a rightward steering operation, the movement direction of the operation object PO may be changed to a rightward direction to a further extent.

When the racing game ends after the operation object PO has reached a finish or the like, a game score is calculated according to the standing of the operation object PO, the operation object PO's action (an in-game event) in a race, etc. For example, a score in the racing game is calculated by adding base points, standing points, and action points. A non-limiting example in-game event of the operation object PO with which the action points are obtained will now be described. Note that in this non-limiting example, action points are used as a non-limiting example of a first parameter.

The user of the operation object PO can fire an item I possessed by the operation object PO by performing a touch operation on the touch panel. For example, the display unit 35 is provided with a plurality of possession frames HF each showing an item I possessed by the operation object PO. In the non-limiting example possession frames HF of FIG. 4, three items I1, I2, and I3 can be possessed in the respective possession frames. One of the items I in the possession frames HF possessed by the operation object PO is displayed, as a ready-to-use item IP, at a ready-to-use position behind the go-kart object of the operation object PO. For example, the ready-to-use item IP is one of the items I in the possession frames HF that was acquired earliest. In the non-limiting example of FIG. 4, the item I1 (a bunch of bananas) displayed in the leftmost possession frame HF is displayed as the ready-to-use item IP at the ready-to-use position. Note that the possession frames HF may be disposed in the virtual space or may overlay the display screen.

In FIG. 5, when a touch operation of swiping the touch panel upward is performed, then if the ready-to-use item IP disposed at the ready-to-use position of the operation object PO is fireable, the item IP is fired as a projectile item IM toward the front of the operation object PO. Note that the ready-to-use item IP and the projectile item IM are typically the same object, and alternatively may be different objects. Some types of ready-to-use items IM (e.g., a banana item) disposed at the ready-to-use position may be fired as the projectile item IM toward the back of the operation object PO when a touch operation of swiping the touch panel downward is performed. Note that if the direction in which the ready-to-use item IP disposed at the ready-to-use position of the operation object PO is fired is fixed, the item IP may be fired as the projectile item IM in the fixed firing direction no matter whether a touch operation of swiping the touch panel is performed upward or downward. Some types of ready-to-use items IP disposed at the ready-to-use position may not be fired from the operation object PO and may be used by the operation object PO itself. In this case, when a touch operation of swiping the touch panel upward is performed, the ready-to-use item IP disposed at the ready-to-use position of the operation object PO is used by the operation object PO.

When the operation object PO fires the projectile item IM, an effect that is advantageous to the progression of a race performed by the operation object PO can be obtained, depending on the type of the projectile item IM. For example, when the projectile item IM indicating a carapace collides with the opponent object EO, the collision may decelerate or stop, i.e., obstruct, the traveling of the opponent object EO, and may cause damage to the opponent object EO, depending on the extent of the collision. When the projectile item IM indicating a bunch of bananas collides with the opponent object EO, the projectile item IM may affect the opponent object EO such that the opponent object EO slips on a road, so that the traveling of the opponent object EO is decelerated or stopped.

Thus, the in-game event that the operation object PO hits an opponent object EO with the projectile item IM, is set as one of in-game events in which individual-action points are obtained. When the in-game event is detected, individual-action points associated with the in-game event are given to the operation object PO. When an in-game event in which individual-action points can be obtained is detected in a race, a detection information image SI for notifying of the detection is displayed in the race. The non-limiting example of FIG. 5 illustrates the detection information image SI indicating that an in-game event that the operation object PO hits an opponent object EO with the projectile item IM is detected, and as a result, 10 individual-action points are obtained and added to a score. Note that the operation object PO's action is a kind of in-game event.

Although the detection information image SI displayed in a race indicates individual-action points added according to an in-game event of the operation object PO, the detection information image SI may indicate another kind of information. For example, the detection information image SI may indicate the cumulative total of individual-action points which have been obtained until the occurrence of that in-game event, in addition to the above individual-action points newly obtained. Alternatively, the detection information image SI may indicate the record of individual-action points that have been obtained by performing several past in-game events in the race.

When an item I has been used, the item I is not currently possessed by the operation object PO, and therefore, the ready-to-use item IP displayed at the ready-to-use position is erased, and the item I in the possession frame HF corresponding to the ready-to-use item IP is also erased (in the non-limiting example of FIG. 5, the item Ti displayed in the leftmost possession frame HF). As a result, the possession frame HF that has displayed the item I that was fired as the projectile item IM is changed to an empty frame E in which no item I is displayed.

Next, an item lottery process performed in the information processing system 1 will be outlined. In the item lottery process, if items I (game objects) possessed by the operation object PO satisfy a predetermined combinational condition, an effect relatively advantageous to progression of a game is given to the operation object PO.

Figure 10:
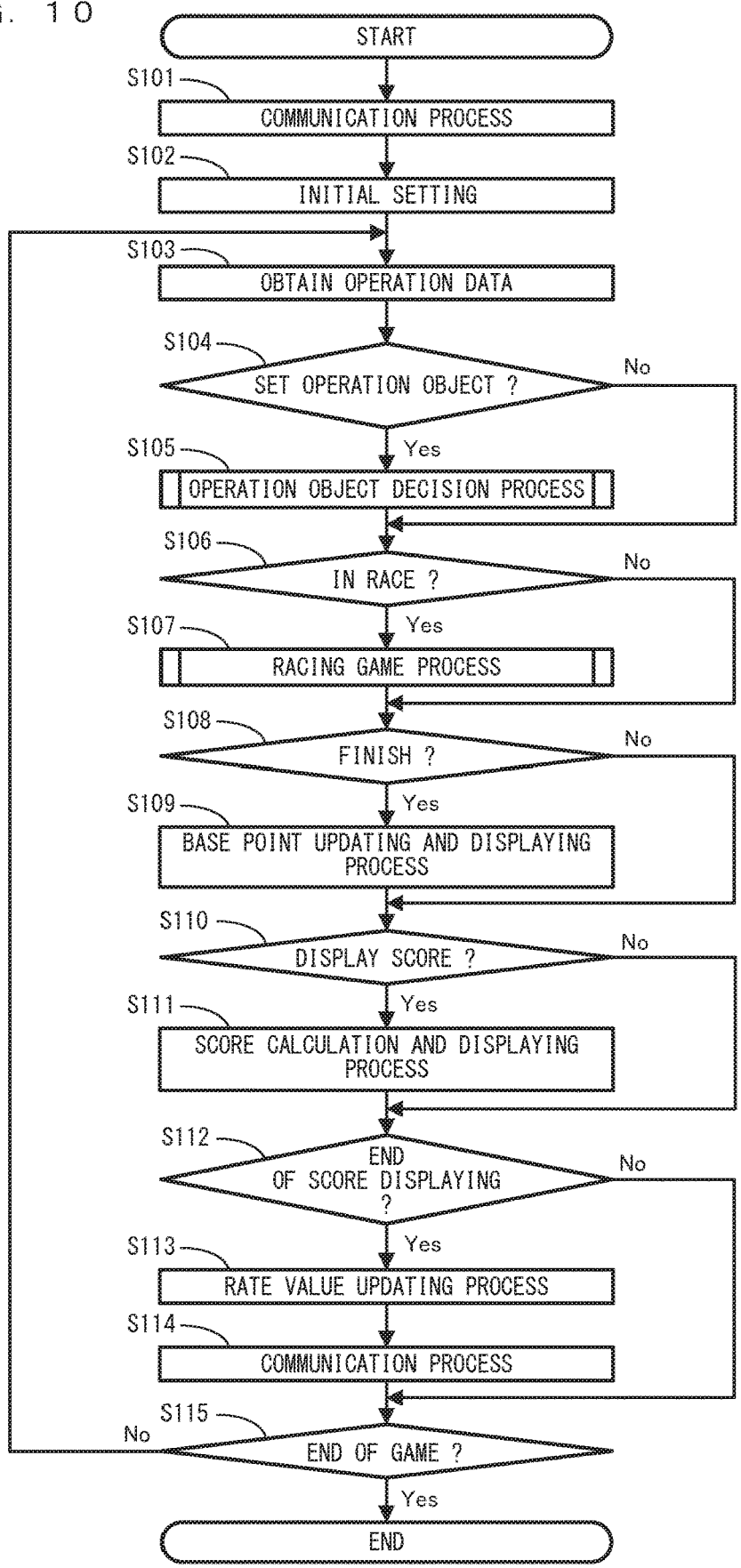
FIG. 10 is a flowchart showing a non-limiting example process executed in the information processing apparatus 3.

As in FIGS. 4 and 5, in FIG. 6, a game image corresponding to a game played in the information processing apparatus 3 is displayed on the display unit 35 of the information processing apparatus 3. In a non-limiting example, FIG. 10 shows a scene that the operation object PO performs a racing game. For example, in the game, the operation object PO is traveling on a course provided in the virtual space, and can acquire a new item I by passing by or through an item box IB placed on the course and thereby opening the item box IB. Note that the operation object PO can acquire a new item I only if there is a possession frame HF that is an empty frame E.

When the operation object PO passes by or through an item box IB and thereby opens the item box IB, a lottery event for acquiring a new item I is performed. For example, a lottery event display (hereinafter referred to a rotation lottery display) that a plurality of types of items I are shuffled and successively displayed in a possession frame HF that is an empty frame E in a drum-spin or flip fashion, and thereafter, any one of the items I is displayed in a stationary state in the possession frame HF, showing that the item I displayed in a stationary state in the possession frame HF is finally acquired in the lottery. For example, FIG. 6 shows a non-limiting example in which in response to the operation object PO passing by or through an item box IB, rotating display items IR indicating that a plurality of types of items I are successively displayed and a lottery is being performed are displayed, i.e., the rotation lottery display is being performed, in all the possession frames HF (three frames). Note that the lottery for acquiring an item I is not performed for a possession frame HF in which an item I is already displayed. Specifically, when a possession frame HF that is an empty frame E and a possession frame HF that is displaying an item I coexist, the item lottery is performed only for the empty frame E. When there is no possession frame HF that is an empty frame E, the item lottery is not performed, and therefore, in this situation, the operation object PO cannot acquire a new item I by the item lottery. Note that even when the operation object PO has not yet reached a position where an item box IB is placed, a lottery event for acquiring a new item I may be performed if the specific position where the item box IB is placed and the position of the operation object PO have a predetermined positional relationship. For example, when the operation object PO reaches within a predetermined distance of an item box IB, passes above or below an item box IB, or passes through a ring-shaped item box IB, a lottery event for acquiring a new item I may be performed. Note that an item box IB may be placed at a specific position on the course, or may appear on the course at any suitable position as time passes.

Items I that are displayed in a stationary state in possession frames HF are finally acquired by the operation object PO through a lottery. After the acquisition, the items I can be used by the operation object PO one by one in a predetermined order (e.g., the order in which the items I have been acquired). By using an item I, the operation object PO can obtain an effect advantageous to progression of a race.

As shown in FIG. 7, in this non-limiting example, if the same items I are finally displayed in all the possession frames HF in a lottery, the user wins a so-called "fever state" and can obtain an effect more advantageous to progression of a race performed by the operation object PO. In a non-limiting example, when the operation object PO is in the "fever state," an item that has caused the "fever state" can be continuously used for a predetermined fever period of time. Note that the fever period may be varied, depending on equipment or the like used by the operation object PO. In this non-limiting example, the condition under which the "fever state" is established is used as a non-limiting example of a second increase or decrease condition.

For example, in the non-limiting example of FIG. 7, the item I1 that is a carapace is displayed in a stationary state in the leftmost possession frame HF, the item 12 that is a carapace is displayed in a stationary state in the middle possession frame HF, and the item 13 that is a carapace is displayed in a stationary state in the rightmost possession frame HF, i.e., the same carapace item I is finally displayed in all the possession frames HF in a lottery. In this case, the "fever state" caused by carapace items is continued for a predetermined period of time, and an advantageous effect obtained by using a carapace item is given to the operation object PO only during the predetermined fever period. For example, in the "fever state" caused by carapace items, a plurality of carapace items IF are disposed around the operation object PO, indicating the "fever state" caused by carapace items to the user. When the user is performing a certain touch operation on the touch panel, a projectile carapace item IM is continually fired toward the front of the operation object PO at predetermined intervals. Thus, while a single projectile carapace item IM can be fired from the operation object PO when a carapace item I is used in a normal state, multiple projectile carapace items IM can be continually fired from the operation object PO in the "fever state" caused by carapace items. In the "fever state," a projectile carapace item IM is continually fired at predetermined intervals without performing a swipe operation for firing the item. Therefore, an item can be repeatedly used while controlling the movement direction of the operation object PO by a touch operation. Furthermore, while an item I can be used once for each possession frame HF in the normal state, i.e., the same number of items I as the possession frames HF (e.g., three) can be used, an indefinite number of items (i.e., greater than or equal to the number of possession frames HF, e.g., four or more) can be continually used without being limited to the number of possession frames HF during the fever period in which the "fever state" caused by the same three items I is continued. Therefore, the fever state is more advantageous to the user than in the normal state. Note that in the "fever state," the traveling speed of the operation object PO may be increased in addition to the above effect.

Thus, the in-game event that the operation object PO hits an opponent object EO with the projectile item IM during the fever period is similarly set as one of in-game events in which individual-action points are obtained. When the in-game event is detected, individual-action points associated with the in-game event are given to the operation object PO. As shown in FIG. 7, when an in-game event in which individual-action points can be obtained is detected in a race, the detection information image SI for notifying of the detection is displayed in the race. In the non-limiting example of FIG. 7, the detection information image SI is displayed which indicates that an in-game event that the operation object PO hits an opponent object EO with the projectile item IM is detected, and as a result, 100 individual-action points (10×10 individual-action points) are obtained and added to a score. Here, even in the case of the same in-game event that an opponent object EO is hit by the projectile item IM, the amount of individual-action points obtained varies depending on whether or not the in-game event occurs during the fever period. Specifically, the amount of individual-action points that are obtained during the fever period is 3-10 times (10 times in the non-limiting example of FIG. 7) as large as the amount of individual-action points obtained during a period other than the fever period. An increase or decrease in the amount of individual-action points that occurs during the fever period is calculated based on the level of a skill (to be described below) of the operation object PO.

Note that the number of possession frames HF may be set based on a combination (relationship) of an operation object PO and a course on which the operation object PO competes in a race. Specifically, when an operation object PO competes in a racing game, the number of possession frames HF that can be used in the racing game is set to any of 1-3. In this case, the fever state may be allowed to occur only if the number of possession frames HF is maximum, i.e., three, and all the possession frames HF have the same item I. Therefore, in order to establish the fever state, an operation object PO needs to be combined with a specific course (stage) in a racing game (the relationship between the operation object PO and the course is optimum). The relationship between an operation object PO and a course for which the number of possession frames HF is one or two is not good in a racing game. Thus, because the number of possession frames HF displayed is varied depending on the relationship between an operation object PO and a course, the user is motivated to select the type of an operation object PO, depending on a course.

The in-game event in which the operation object PO can obtain individual-action points may include other in-game events that occur in a race, in addition to the in-game event that the operation object PO hits an opponent object EO with the projectile item IM. In a non-limiting example, individual-action points may be added when an in-game event that the operation object PO fires the projectile item IM has occurred, irrespective of whether or not the projectile item IM has successfully hit the opponent object EO. In another non-limiting example, starting with excellent timing (explosive start), continuing to travel in the first position in a race (maintaining the lead), drifting (mini-turbo dash), jumping (jumping action), destroying an object (e.g., an object disposed on a course, such as a pylon) other than opponent objects EO (object destruction), traveling behind an opponent object EO with reduced air resistance (slipstreaming), dash traveling, special traveling set for each operation object PO, etc., may be set as an in-game event in which an operation object PO can obtain individual-action points. In addition, in these in-game events, the amount of individual-action points that are obtained, or whether or not individual-action points can be obtained, may be changed according to the level of the in-game event or the ability of the operation object PO (the degree of an achievement, the length of duration, the type of an operation object PO, the base point of an operation object PO, the state of an operation object PO, etc.). In a first non-limiting example, individual-action points obtained by starting with good timing (explosive start) is set to a value that increases as the timing of starting an acceleration action is closer to the set timing that is a predetermined time before the start of a race. In a second non-limiting example, individual-action points obtained by continuing to travel in the first position in a race (maintaining the lead) can be obtained when the lead is maintained for at least a predetermined period of time in a race, and are set to a value obtained by multiplying standing points to be described below (the rate value of a user×a coefficient corresponding to the standing×the difficulty of a racing game) by 0.01 each time the lead is maintained for five seconds. In a third non-limiting example, individual-action points obtained by drifting (mini-turbo dash) are set to a value that increases with an increase in the duration that the drifting is continued. Note that, in the third non-limiting example, individual-action points may be set to a fixed value irrespective of the duration of drifting. In a fourth non-limiting example, individual-action points obtained by special traveling can be obtained only when the special traveling performed by an operation object PO (e.g., underwater movement, flying in the air, night traveling, traveling on unpaved road, traveling in bad weather, etc.) can be carried out by a skill set for the operation object PO. Specifically, for example, in the case where an operation object PO has a skill for underwater movement, individual-action points are added at regular intervals during the time that the operation object PO is performing underwater movement.

Character objects, machine objects, and kite objects that are used in the above racing game may be purchasable using virtual currency or in-game coins. In that case, a process of purchasing a character object, machine object, and kite object may be managed by the server 200 through communication with the server 200. When a character object, machine object, and kite object are purchased, the types thereof may be determined by the server 200 performing a lottery. In the case where purchase is thus carried out by a lottery, the same type of objects may be possessed. In that case, when objects of the same type are obtained by a lottery, the levels or base points of the possessed objects may be increased. In a non-limiting example, when objects of the same type are obtained, and therefore, the skill levels of the objects are increased, the absolute value of action points obtained by causing the objects to participate in a race may be increased, or the number of in-game events in which individual-action points are obtained may be increased, compared to before the increase of the skill levels of the objects.

Individual-action points obtained by an operation object PO in an in-game event may be increased or decreased according to the details, level, or the like of a skill of the operation object PO. For example, when drifting, which is an in-game event in which individual-action points can be obtained, is performed, then if an operation object PO has a particular skill, individual-action points obtained may be increased according to the level of the skill. Note that in this non-limiting example, the details, level, or the like of a skill of an operation object PO is used as an example of a first increase or decrease condition.

The in-game event in which an operation object PO can obtain individual-action points may be one that puts an operation object PO at a disadvantage in a racing game. In a non-limiting example, when an operation object PO deviates from a course in a racing game, traveling is obstructed by an obstacle on a course (e.g., falling in a hole on a course, and colliding with an obstacle), or an operation object PO is attacked or obstructed by an opponent object EO, individual-action points may be given to the operation object PO. In another non-limiting example, individual-action points may be given to an operation object PO according to a period of time during which the operation object PO is traveling in a position (e.g., the lowest position or the second lowest position) in the standings lower than a predetermined position in a race. When an operation object PO is attacked or obstructed by an opponent object EO, even then if the operation object PO defends against the attack or obstruction using a defense item, individual-action points may be given to the operation object PO according to the in-game event that the operation object PO defends against the attack or obstruction.

Next, base points and standing points, which are used in calculation of a score in a racing game, will be described. In a non-limiting example, as shown in FIG. 8, a score in a racing game is calculated by adding, to base points, standing points that are calculated from a standing in a race, and adding, to the resultant points, action points that are obtained in the race.

Base points are calculated based on character points, machine points, and kite points associated with an operation object PO. In a non-limiting example, as shown in FIG. 8, base points are calculated by adding up character points, machine points, and kite points associated with an operation object PO. Note that in this non-limiting example, base points are used as a non-limiting example of a second parameter. In this non-limiting example, character point, machine points, and kite points are used as a non-limiting example of a base parameter for each in-game object.

Character points, which are associated with an operation character object which sits on a vehicle object as a part of an operation object PO, are set as a portion of base points when the operation character object is caused to sit on a vehicle object and participate in a racing game. For example, character points are set for each operation character object that can be selected by the user. When the user selects and causes an operation character object A to participate in a racing game, character points (in a non-limiting example shown in FIG. 8, 57 character points) associated with the operation character object A are set as a portion of base points.

Machine points, which are associated with a machine object included in a vehicle object that is a part of an operation object PO, are set as a portion of base points when the machine object participates in a racing game. For example, machine points are set for each machine object that can be selected by the user. When the user selects and causes a machine object B to participate in a racing game, machine points (in the non-limiting example of FIG. 8, 14 machine points) associated with the machine object B are set as a portion of base points.

Kite points, which are associated with a kite object included in a vehicle object that is a part of an operation object PO, are set as a portion of base points when the kite object participates in a racing game with the kite object attached to a machine object that participates in the racing game. For example, kite points are set for each kite object that can be selected by the user. When the user attaches a kite object C to a machine object and thereby causes the kite object C to participate in a racing game, kite points (in the non-limiting example of FIG. 8, 10 kite points) associated with the kite object C are set as a portion of base points.

Note that in the foregoing, it is, for example, assumed that the base points of an operation object PO are calculated based on character points, machine points, and kite points associated with the operation object PO. Alternatively, the base points of an operation object PO may be calculated using other embodiments. For example, the base points of an operation object PO may be any one (e.g., only character points) of character points, machine points, and kite points associated with the operation object PO.

In addition, an experience value is set for each of an operation character object, for which character points are set, a machine object, for which machine points are set, and a kite object, for which kite points are set. Here, each time an operation object PO participates in a racing game, the experience value is accumulated based on the result in the racing game. For example, when an operation object PO operated by the user participates in a racing game and reaches a finish, a value corresponding to a position in standings in which the operation object PO has reached a finish (e.g., first position: +5, second position: +4, third position: +3, fourth position: +2, and fifth position and higher positions: +1) is added to the experience value of each of an operation character object, machine object, and kite object constituting the operation object PO. These experience values are not reset even after the start of the next racing game, and continue to be set and accumulated in the next racing game and following racing games. Note that as used herein, the term "not reset" with respect to a value includes the case where even when the value is temporarily initialized after the end of a game, the value continues to be used in a game (e.g., the term "not reset" means that the experience value is not initialized to zero or a value before addition). The value that is added to an experience value according to a position in standings in which the operation object PO operated by the user has reached a finish, may be different for each of a character object, machine object, and kite object.

When the cumulative value of the experience value of an operation character object, machine object, or kite object exceeds a predetermined threshold, a predetermined value is added to the character points, machine points, or kite points of the operation character object, machine object, or kite object, respectively, that exceeds the threshold. For example, when the cumulative value of the experience value of an operation character object participating in a race is 10, the amount of character points of the operation character object is increased by +3. These character points, machine points, and kite points are not reset even after the start of the next racing game, and continue to be set and accumulated in the next racing game and following racing games. Thus, character points, machine points, and kite points, which are base points, are increased based on the result of a racing game (e.g., a position in standings), and serves as a parameter that continues to be used in multiple racing games (i.e., a racing game is performed a plurality of times). Note that in this non-limiting example, a position in standings (or a standing) is used as a non-limiting example of an assessment parameter that is different from a final score.

Although in the foregoing, it is, for example, assumed that when the cumulative value of an experience value exceeds a predetermined threshold, the amount of character points, machine points, or kite points is increased by a predetermined value, an experience value may not be provided for the objects. In that case, a value corresponding to a position in standings in which an operation object PO operated by the user has reached a finish may be added directly to the character points of a character object, the machine points of a machine object, or the kite points of a kite object.

Standing points are calculated based on a rate value set for a user playing a racing game, a coefficient corresponding to a position in standings in the racing game, and the difficulty of the racing game in which the user participates. In a non-limiting example, standing points are calculated by multiplying these values together, i.e., the rate value×the coefficient×the difficulty.

The rate value, which indicates a proficiency in a racing game that is set for each user, is increased or decreased according to a position in standings in a racing game in which the user participates, and the difficulty of the racing game. For example, a greater value is added to the rate value after the user has reached a finish in a racing game as a position in standings in the racing game is higher, and the rate value is not reset even after the start of the next racing game, and continues to be set and accumulated in the next racing game and following racing games. In addition, a greater value is added to the rate value after the user has reached a finish in a racing game as the rate value of an opponent that the user has defeated is greater, and the rate value is not reset even after the start of the next racing game, and continues to be set and accumulated in the next racing game and following racing games. Note that the rate value may be decreased, depending on the result of a racing game. For example, when the result of a racing game does not meet a predetermined assessment standard, e.g., a position in standings in a racing game is lower than a predetermined position, or the user retires in the middle of a racing game, the rate value is decreased according to the result. Thus, the rate value is increased or decreased according to the result (e.g., a position in standings) of a racing game, and therefore, serves as one of parameters that continue to be used in multiple racing games. Note that the rate value may be increased or decreased, as appropriate, according to an existing rule by a rating scheme. In this non-limiting example, the rate value is used as a non-limiting example of a second parameter.

The coefficient is set to a value corresponding to a position in standings in a racing game that is different from the score. Specifically, the coefficient is set to 1.0 when the result of a racing game is the first position in standings, 0.8 when the result of a racing game is the second position in standings, 0.6 when the result of a racing game is the third position in standings, and 0.4 when the result of a racing game is the fourth position or lower positions in standings, Note that the coefficient corresponding to a position in standings may not be changed, depending on the difficulty or the like of a racing game, and may be fixed for all racing games.

The value corresponding to the difficulty is set to a greater value as the difficulty of a racing game increases. For example, the value corresponding to the difficulty is increased in, for example, the following cases: an opponent object EO is strong; the number of opponent objects EO is large; a vehicle object used in a racing game has a high-level feature (a machine object has a large engine displacement, a machine object has a large size, a machine object has a high maximum speed, a machine object has a high acceleration, a kite object has a long flight distance, a kite object has a high flight altitude, etc.); and the difficulty of a course used in a racing game is high. Note that the difficulty of a racing game in which an operation object PO participates may be selectable by the user's operation before the start of the racing game.

As shown in FIG. 8, the score of a racing game is calculated by adding standing points (in the non-limiting example of FIG. 8, 120 standing points because of the rate value=100, the coefficient=1.0, and the value corresponding to the difficulty=1.2) to base points (in the non-limiting example of FIG. 8, 81 base points), and then adding, to the resultant value, action points obtained in the racing game (in the non-limiting example of FIG. 8, 165 action points). For example, action points are calculated by adding up individual-action points each time an in-game event of an operation object PO that is to provide individual-action points is detected. In the non-limiting example of FIG. 8, concerning an in-game event of an operation object PO that is to provide action points in a racing game, two sets of 10 individual-action points are obtained because an action of hitting an item in a normal state has been detected two times, a set of 100 individual-action points (10 individual-action points×10) is obtained because an action of hitting an item in a fever state has been detected once, 36 individual-action points are obtained because an action of maintaining the lead has been detected for a predetermined period of time, 6 individual-action points are obtained because an action of jumping has been detected once, and 3 individual-action points are obtained because a mini-turbo dash action at level 2 has been detected once, and a total of 165 action points have been accumulated in the racing game. Note that at the start of the next racing game, the cumulative value of action points is reset to zero, and action points are accumulated again from zero. Thus, action points serve as one of parameters that are reset at the start of the next racing game, and are accumulated based on in-game events (actions) in the next racing game.

Note that the final score in a racing game may be increased according to a special item (e.g., a boosting item)

that adds points to the score or the amount of in-game currency when the user has used the special item or in-game currency before an operation object PO starts the racing game. For example, the final score in a racing game may be increased by being multiplied by a coefficient (e.g., 1.1) greater than one that corresponds to the type of an item or the amount of in-game currency that has been used by an operation object PO.

Thus, the score in a racing game is calculated based on a parameter (base points, the rate value) that continues to be used in multiple racing games, and a parameter (action points) that is reset at the start of the next racing game. The former parameter (base points, the rate value) is increased or decreased based on the result (e.g., a position in standings) of a racing game that is an assessment parameter different from the magnitude of the score. The latter parameter (action points) is accumulated again in each racing game. The user can obtain a reward according to the final score when the final score at the end of a racing game is good. For example, the reward that can be obtained according to the final score may be a game item or in-game currency that can be used in a racing game, virtual currency that can be obtained by the user's payment, a right to play the next stage that is obtained by clearing a stage, or the like.

In the foregoing, when an operation object PO comes into contact with an item box IB disposed on a course in a race, the operation object PO can obtain a temporary effect that is effective in that race by the use of an item I. Alternatively, the temporary effect may be obtained without such a contact with an item box IB. For example, instead of a lottery event for a new item I that is triggered when the operation object PO comes into contact with an item box IB, a lottery event for a new item I may be automatically performed at predetermined intervals.

Next, processes performed in the information processing apparatus 3 will be described in detail. Firstly, main data used in processes performed in the information processing apparatus 3 will be described with reference to FIG. 9. Note that FIG. 9 is a diagram showing non-limiting example main data and programs stored in the storage unit 32 of the information processing apparatus 3.

Figure 9:
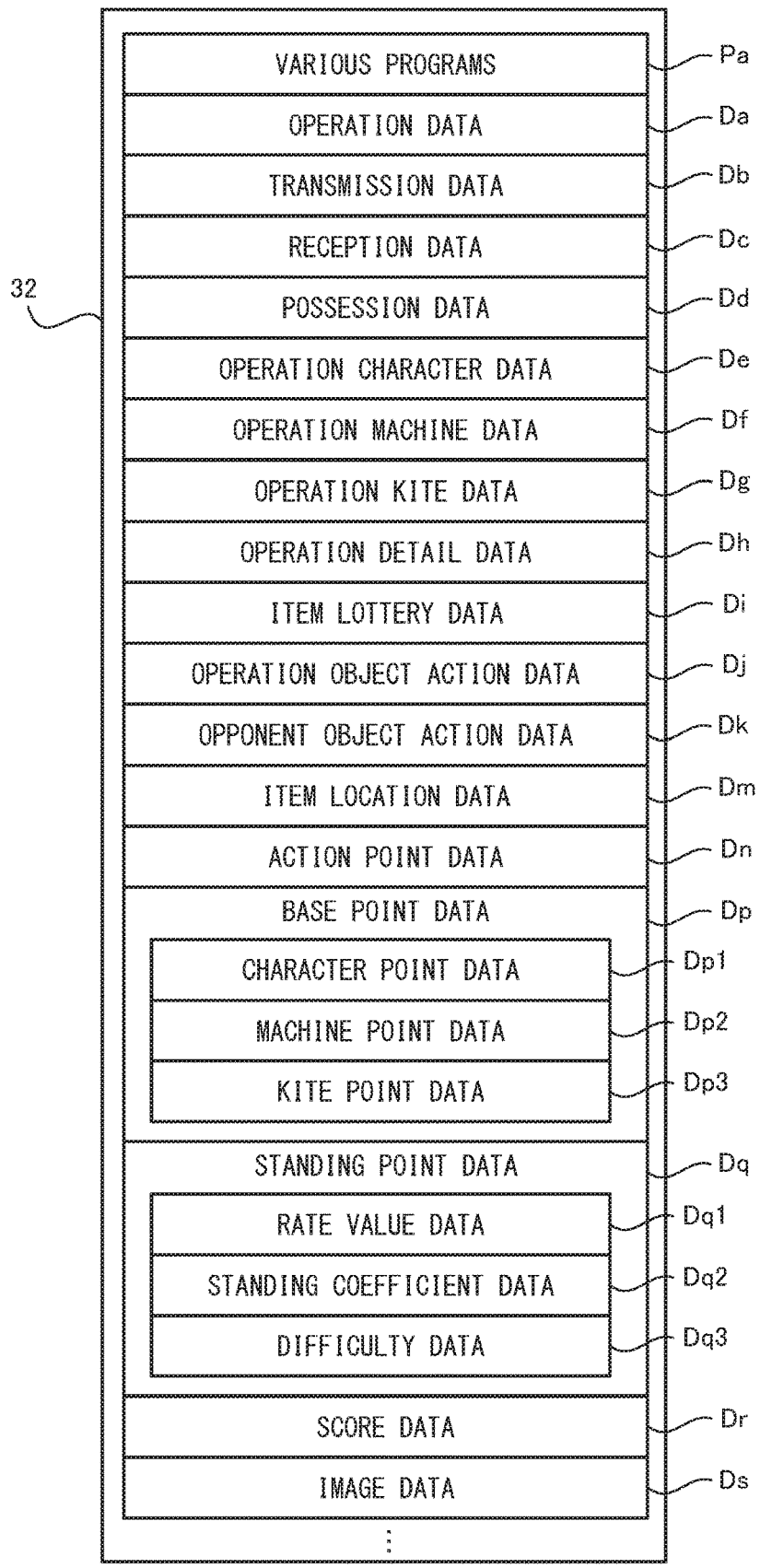
FIG. 9 is a diagram showing non-limiting example main data and programs stored in a storage unit 32 of the information processing apparatus 3.

As shown in FIG. 9, the storage unit 32 stores, in a data storage area, operation data Da, transmission data Db, reception data Dc, possession data Dd, operation character data De, operation machine data Df, operation kite data Dg, operation detail data Dh, item lottery data Di, operation object action data Dj, opponent object action data Dk, item location data Dm, action point data Dn, base point data Dp, standing point data Dq, score data Dr, image data Ds, etc. Note that the storage unit 32 stores, in addition to data contained in the information of FIG. 9, data, etc., data required in the process such as data used in an executed application. The storage unit 32 also stores, in a program storage region, various programs Pa including a communication program and an information processing program (game program).

The operation data Da indicates operation information about the user's operation on the information processing apparatus 3. For example, operation data indicating an operation performed on the input unit 34 including the touch panel is acquired at time intervals that are a unit process time (e.g., 1/60 sec) of the information processing apparatus 3, and the operation data Da is updated with the acquired operation data.

The transmission data Db is stored as data to be transmitted to the server 200. The reception data Dc has been received from the server 200.

The possession data Dd includes various kinds of data related to character objects, machine objects, and kite objects possessed by the user. For example, the possession data Dd includes data indicating the ability value, relationship with a course (the number of possession frames), experience value, character points, etc., of each character object possessed by the user, data indicating the ability value, experience value, machine points, etc., of each machine object possessed by the user, and data indicating the ability value, experience value, kite points, etc., of each kite object possessed by the user. The possession data Dd may also include various kinds of data indicating virtual currency, in-game coins, other pieces of equipment, items, play level (e.g., the rate value), user ID, etc., possessed by the user. Any of the above kinds of data in the possession data Dd may be managed by the server 200, and may be transmitted from the server 200 and set before the start of a game.

The operation character data De is related to an operation character object that has been selected as a part of an operation object PO from character objects possessed by the user. For example, the operation character data De includes data for identifying the selected operation character object, and data indicating a skill, ability value, relationship with a course (the number of possession frames), experience value, character points, etc., set for the operation character object.

The operation machine data Df is related to an operation machine object that has been selected as a part of an operation object PO from machine objects possessed by the user. For example, the operation machine data Df includes data for identifying the selected operation machine object, and data indicating a skill, ability value, experience value, character points, etc., set for the operation machine object.

The operation kite data Dg is related to an operation kite object that has been selected as a part of an operation object PO from kite objects possessed by the user. For example, the operation kite data Dg includes data for identifying the selected operation kite object, and data indicating a skill, ability value, experience value, character points, etc., set for the operation kite object.

The operation detail data Dh indicates the details of an operation that has been performed on the information processing apparatus 3. For example, the operation detail data Dh indicates a steering wheel angle, moving speed, firing direction, etc., calculated from the direction and length of a swipe input performed on the input unit 34 (touch panel).

The item lottery data Di includes data that is used in a process of performing a lottery for an item I that is to be disposed in each possession frame HF, and data indicating the result of the lottery.

The operation object action data Dj indicates an action of an operation object PO, and includes the position, speed, orientation, number of laps, standing, etc., of the operation object PO in a race. The opponent object action data Dk indicates an action of an opponent object EO, and includes the position, speed, orientation, number of laps, standing, etc., of the opponent object EO in a race. The item position data Dm indicates the position of an icon I (ready-to-use item IP) disposed at the ready-to-use position, and the position of a fired icon I (projectile item IM).

The action point data Dn indicates action points that have been calculated according to an operation object PO's action in a race. The base point data Dp indicates the value of base points that have been obtained by adding up points set for objects included in an operation object PO that have been selected by the user.

The base point data Dp includes character point data Dp1, machine point data Dp2, and kite point data Dp3. The standing point data Dq indicates the value of standing points that has been calculated according to a position in standings in a racing game. The standing point data Dq includes rate value data Dq1, standing coefficient data Dq2, and difficulty data Dq3.

The score data Dr indicates a game score that has been obtained in a racing game.

The image data Ds is data for displaying a game image (e.g., an image of an operation object PO, an image of an opponent object EO, an image of an item I, an image of a possession frame HF, an image of another virtual object, a field image of a course, etc., a background image, etc.) on the display unit 35 of the information processing apparatus 3 in the game.

Figure 11:
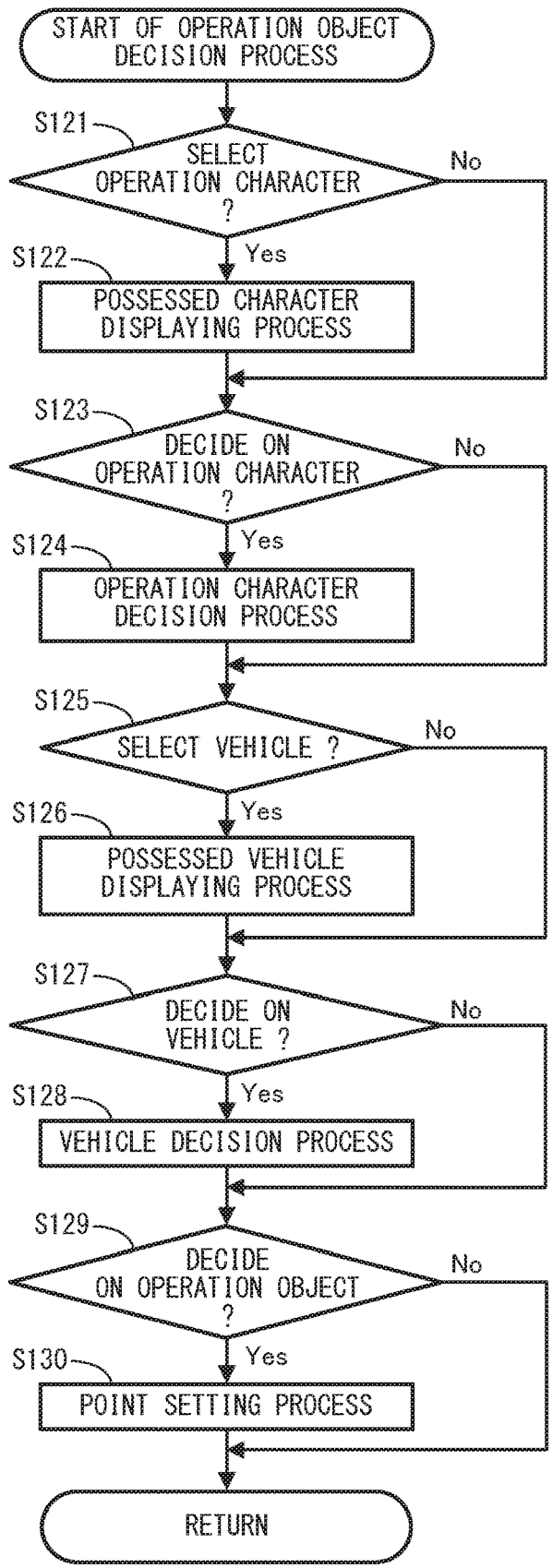
FIG. 11 is a subroutine showing a detailed non-limiting example of an operation object decision process in step S105 of FIG. 10.
Figure 12:
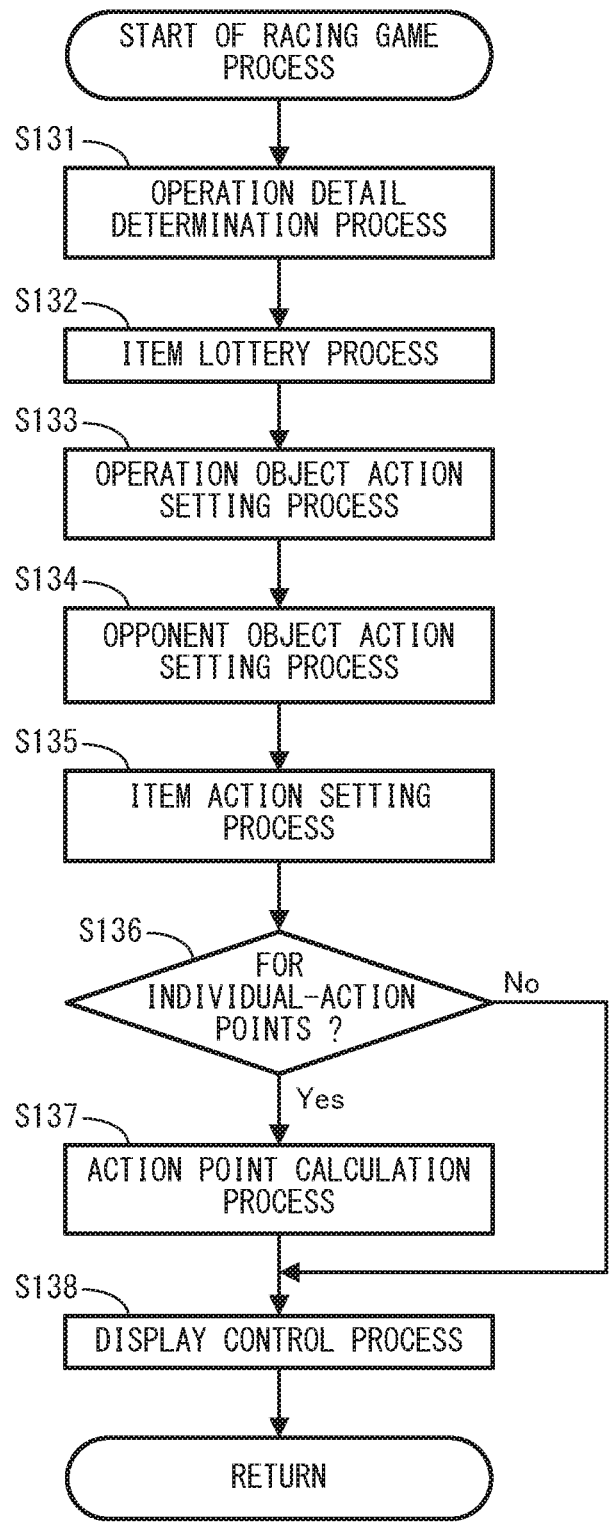
FIG. 12 is a subroutine showing a detailed non-limiting example of a racing game process in step S107 of FIG. 10.

Next, processes performed in the information processing apparatus 3 will be described in detail with reference to FIGS. 10-12. Note that FIG. 10 is a flowchart showing a non-limiting example process executed in the information processing apparatus 3. FIG. 11 is a subroutine showing a detailed non-limiting example of an operation object decision process in step S105 of FIG. 10. FIG. 12 is a subroutine showing a detailed non-limiting example of a racing game process in step S107 of FIG. 10. Here, of the processes of the information processing system 1 in the flowcharts of FIGS. 10-12, game processes involved in a process of performing a racing game based on an operation performed on an operation object PO, will be mainly described as a non-limiting example, and other processes that are not directly involved with these processes will not be described in detail. In FIGS. 10-12, each step executed by the control unit 31 is abbreviated to "S."

In this non-limiting example, steps shown in FIGS. 10-12 are performed by the control unit 31 (CPU) executing a communication program or game program stored in the program storage unit 33. Note that the processes of FIGS. 10-12 are started with any appropriate timing. At this time, all or a portion of the communication program or game program is read from the storage unit 32 with appropriate timing, and is executed by the control unit 31. Thus, the processes of FIGS. 10-12 are started. Note that the communication program and the game program are assumed to be previously stored in the program storage unit 33. In another non-limiting example embodiment, the communication program and the game program may be obtained from a storage medium removably attached to the information processing apparatus 3, and stored in the storage unit 32, or may be obtained from another apparatus through a network, such as the Internet, and stored in the storage unit 32.

The steps of the flowcharts of FIGS. 10-12 are merely illustrative, and if a similar result is obtained, the order in which the steps are performed may be changed, and another step may be executed in addition to or instead of each step. Although, in the non-limiting example embodiment, it is assumed that each step of the flowcharts is executed by the control unit 31, all or a portion of the steps of the flowcharts may be executed by a processor other than the CPU of the control unit 31 or a dedicated circuit.

In FIG. 10, the control unit 31 performs a communication process (step S101), and proceeds to the next step. For example, the control unit 31 transmits transmission data (e.g., data for user authentication (in a non-limiting example, data indicating the user's ID)) stored in the transmission data Db to the server 200 through the network 100. The control unit 31 receives data from the server 200 through the network 100, and updates the reception data Dc using the received data. In a non-limiting example, when a game is played along with another information processing apparatus 3 or in only the information processing apparatus 3 itself, the control unit 31 exchanges data for playing the game with the server 200, as appropriate, in step S101.

Next, the control unit 31 sets initial settings (step S102), and proceeds to the next step. For example, the control unit 31 initially sets parameters for use in the subsequent steps. The control unit 31 also initially sets the possession data Dd based on contents such as an object and an item that are currently possessed by the user. For example, in step S101, the control unit 31 receives, from the server 200, at least a portion of data possessed by the user (e.g., data related to virtual currency, in-game coins, characters (character objects and character points of each character object), vehicles (machine objects and machine points of each machine object, and kite objects and kite points of each kite object), items, experience values, a play level (rate value), etc.), data for progression of a racing game to be described below (e.g., lottery table data), etc. Thereafter, the control unit 31 initially sets the possession data Dd and the item lottery data Dj based on the data received from the server 200 and the data stored in the information processing apparatus 3. Note that for at least character points, machine points, kite points, and the user's rate value, the values thereof at the end of the previous game are maintained at the start of the following game and are set in the possession data Dd.

Next, the control unit 31 acquires operation data from the input unit 34 and updates the operation data Da (step S103), and proceeds to the next step.

Next, the control unit 31 determines whether or not to set an operation object (step S104). For example, if the most recent operation data obtained in step S103 indicates an operation of starting to set an operation object or if an operation object is being set, the result of the determination by the control unit 31 in step S104 is positive. If the control unit 31 determines to set an operation object, the control unit proceeds to step S105. Otherwise, i.e., if the control unit 31 determines not to set an operation object, the control unit proceeds to step S106.

In step S105, the control unit 31 performs an operation object decision process, and proceeds to step S106. The operation object decision process performed in step S105 will now be described with reference to FIG. 11.

In FIG. 11, the control unit 31 determines whether or not to select an operation character (step S121). For example, if the most recent operation data obtained in step S103 indicates an operation of starting to select an operation character or if an operation character is being selected, the result of the determination by the control unit 31 in step S121 is positive. If the control unit 31 determines to select an operation character, the control unit 31 proceeds to step S122. Otherwise, i.e., if the control unit 31 determines not to select an operation character, the control unit 31 proceeds to step S123.

In step S122, the control unit 31 performs a possessed character displaying process, and proceeds to step S123. For example, the control unit 31 performs a display control process of generating an image of character objects possessed by the user based on the possession data Dd, which prompts the user to select an operation character object from the character objects, and displaying the image on the display unit 35.

In step S123, the control unit 31 determines whether or not to decide on an operation character. For example, if the most recent operation data obtained in step S103 indicates an operation of deciding on an operation character, the result of the determination by the control unit 31 in step S123 is positive, and the control unit 31 ends the process of selecting an operation character. If the control unit 31 determines to decide on an operation character, the control unit 31 proceeds step S124. Otherwise, i.e., if the control unit 31 determines not to decide on an operation character, the control unit 31 proceeds to step S125.

In step S124, the control unit 31 performs an operation character decision process of deciding on an operation character object from the displayed character objects, and proceeds to step S125. For example, the control unit 31 selects one from the displayed character objects, as an operation character object, based on the operation data obtained in step S103, and updates the operation character data De with data related to the operation character object (e.g., data indicating a skill, ability value, relationship with a course (the number of possession frames), experience value, character points, etc.).

In step S125, the control unit 31 determines whether or not to select a vehicle. For example, if the most recent operation data obtained in step S103 indicates an operation of starting to select a vehicle (a machine object and a kite object) or if a vehicle is being selected, the result of the determination by the control unit 31 in step S125 is positive. If the control unit 31 determines to select a vehicle, the control unit 31 proceeds to step S126. Otherwise, i.e., if the control unit 31 determines not to select a vehicle, the control unit 31 proceeds to step S127.

In step S126, the control unit 31 performs a possessed vehicle displaying process, and proceeds to step S127. For example, the control unit 31 performs a display control process of generating an image of machine objects and/or kite objects possessed by the user based on the possession data Dd, which prompts the user to select an operation machine object and/or an operation kite object from the machine objects and/or the kite objects, and displaying the image on the display unit 35.

In step S127, the control unit 31 determines whether or not to decide on a vehicle. In a non-limiting example, if the most recent operation data obtained in step S103 indicates an operation of deciding on a machine, the result of the determination by the control unit 31 in step S127 is positive, and ends the process of selecting a machine. In another non-limiting example, if the most recent operation data obtained in step S103 indicates an operation of deciding on a kite, the result of the determination by the control unit 31 in step S127 is positive, and the control unit 31 ends the process of selecting a kite. If the control unit 31 determines to decide on a vehicle, the control unit 31 proceeds to step S128. Otherwise, i.e., if the control unit 31 determines not to decide on a vehicle, the control unit 31 proceeds to step S129.

In step S128, the control unit 31 performs a vehicle decision process of deciding on an operation machine object and/or a kite object from the displayed machine objects and/or kite objects, and proceeds to step S129. In a non-limiting example, the control unit 31 selects one from the displayed machine objects, as an operation machine object, based on the operation data obtained in step S103, and updates the operation machine data Df with data related to the operation machine object (e.g., data indicating a skill, ability value, experience value, machine points, etc.). In another non-limiting example, the control unit 31 selects one from the displayed kite objects, as an operation kite object, based on the operation data obtained in step S103, and updates the operation kite data Dg with data related to the operation kite object (e.g., data indicating a skill, ability value, experience value, kite points, etc.).

In step S129, the control unit 31 determines whether or not to decide on an operation object PO which is to participate in a race, and start the race. In a non-limiting example, if the most recent operation data obtained in step S103 indicates an operation of deciding on an operation object PO and starting a race, the result of the determination by the control unit 31 in step S129 is positive. If the control unit 31 determines to decide on an operation object PO and start a race, the control unit 31 proceeds to step S130. Otherwise, i.e., if the control unit 31 determines not to decide on an operation object PO or start a race, the control unit 31 ends the subroutine.

In step S130, the control unit 31 performs a point setting process of setting action points, base points (character points, machine points, and kite points), and standing points (points calculated based on the rate value), and ends the subroutine.

For example, the control unit 31 updates the character point data Dp1 with the character points of the operation character object indicated by the operation character data De. Here, the most recent value of character points set at or after the end of use of the operation character object in the previous racing game, is maintained in the following racing game, and is set in the character point data Dp1. The control unit 31 also updates the machine point data Dp2 with the machine points of the operation machine object indicated by the operation machine data Df. Here, the most recent value of machine points set at or after the end of use of the operation machine object in the previous racing game, is maintained in the following racing game, and is set in the machine point data Dp2. The control unit 31 also updates the kite point data Dp3 with the kite points of the operation kite object indicated by the operation kite data Dg. Here, the most recent value of kite points set at or after the end of use of the operation kite object in the previous racing game, is maintained in the following racing game, and is set in the kite point data Dp3. Thus, base points (character points, machine points, and kite points) serve as a parameter that continues to be used in multiple racing games. Note that the most recent value set at or after the end of use in a racing game indicates a value after the increase or decrease of points as a result of the racing game. Specifically, in the case where points are increased or decreased immediately before the end of a racing game, the most recent value is set, including that increase or decrease performed immediately before the end of the racing game. In the case where points are increased or decreased after the end of a racing game, the most recent value is set, including that increase or decrease performed after the end of the racing game.

The control unit 31 also updates the rate value data Dq1 with the rate value of the user indicated by the possession data Dd. Here, the most recent value of the rate value set when the user ended the previous racing game is maintained in the following racing game, and is set in the rate value data Dq1. Specifically, the rate value of the user serves as a parameter that continues to be used in multiple racing games. Note that when the rate value at the end of the previous racing game has already been stored in the rate value data Dq1, the control unit 31 may directly use the rate value indicated by the rate value data Dq1.

The control unit 31 also resets action points indicated by the action point data Dn to an initial value (e.g., 0) to update the action point data Dn. Thus, action points serve as a parameter that is reset at the start of a new racing game and is then set in the action point data Dn, and is used in the new racing game.

Referring back to FIG. 10, after the control unit 31 determines not to set an operation object in step S104, or after the operation object decision process in step S105, the control unit 31 determines whether or not a racing game is being played (step S106). For example, if the user has performed an operation of starting a racing game, a predetermined start condition for starting a racing game is satisfied, or a racing game is being played after the start of a racing game, the result of the determination by the control unit 31 in step S106 is positive. If a racing game is being played, the control unit 31 proceeds to step S107. Otherwise, i.e., if a racing game is not being played, the control unit 31 proceeds to step S108. Note that when a racing game is started, the control unit 31 sets the difficulty of the racing game, depending on a course used in the racing game, and updates the difficulty data Dq3 with the difficulty.

In step S107, the control unit 31 performs a racing game process, and proceeds to step S108. The racing game process performed in step S107 will now be described with reference to FIG. 12.

In FIG. 12, the control unit 31 performs a process of determining details of an operation (step S131), and proceeds to the next step. For example, the control unit 31 obtains a touch location coordinate point on the touch panel based on the operation data obtained in step S103, adds the touch input coordinate point to touch path coordinate points, and calculates a direction of the touch path in a display screen coordinate system. Based on the direction of the touch path, the control unit 31 sets the steering wheel angle of the operation object PO and the firing direction of an item I, as details of an operation, to update the operation detail data Dh. Note that when the operation data obtained in step S103 indicates a tapping operation, the control unit 31 may set details of an operation based on a displayed image on which the tapping operation was performed. When the operation data obtained in step S103 indicates the release of a touch, the control unit 31 may set the absence of an operation as details of the operation.

Next, the control unit 31 performs an item lottery process (step S132), and proceeds to the next step. For example, if the possession frames HF includes an empty frame E, and the operation object PO has passed through an item box IB disposed on a course and thereby has opened the item box IB, the control unit 31 starts an item lottery event process in which the rotation lottery display of a plurality of types of items I in a possession frame(s) HF that is an empty frame E is performed, and thereafter, any one of the items I is displayed in a stationary state in the possession frame HF. Thereafter, the control unit 31 determines whether or not the "fever state" is won, based on a winning probability described in a lottery table. When the lottery is won, an item I (i.e., a single item I appearing in all the possession frames HF) is determined, and when the lottery is not won, an item I displayed in a stationary state is determined for each possession frame HF. An image for notifying of the result of the item lottery is generated and displayed on the display unit 35. When the control unit 31 transitions to the fever state, the control unit 31 sets the action of the operation object PO to an action performed in the fever state caused by the item I displayed in a stationary state, during a predetermined fever period.

Next, the control unit 31 performs a process of setting an action of the operation object PO, based on the user's operation (step S133), and proceeds to the next step. For example, the control unit 31 sets the location and orientation of the operation object PO, taking into account the details (e.g., a steering wheel angle) of an operation set in the operation detail data Dh and an influence from another virtual object, etc., and determines the action, location, orientation, etc., of the operation object PO, taking into account the state of the operation object PO set in the operation object action data Dj, and updates the operation object action data Dj.

Next, the control unit 31 performs a process of setting an action of an opponent object EO (step S134), and proceeds to the next step. In a non-limiting example, in the case where the action of an opponent object EO is controlled by the control unit 31, the control unit 31 causes the opponent object EO to perform an action according to a predetermined algorithm, and updates opponent object data Dx based on the action. In another non-limiting example, in the case where the action of an opponent object EO is controlled by another user, the control unit 31 causes the opponent object EO to perform an action based on the second user's operation in a manner similar to that of the operation object PO, and updates the opponent object data Dx based on the action.

Next, the control unit 31 performs a process of setting an action of an item based on the user's operation (step S135), and proceeds to the next step. For example, if the details of an operation set in the operation detail data Dh indicate firing of an item I (e.g., a firing direction), the control unit 31 performs a process of firing the projectile item IM from the firing platform location of the operation object PO, and moving the projectile item IM fired from the operation object PO based on the firing direction, and updates the item location data Dm based on the location and orientation after the movement. Note that when an operation of firing an item is performed during the fever period, the control unit 31 performs a process of continually using an item that has caused the "fever state." In a non-limiting example, the control unit 31 continually fires the projectile item IM toward a direction in front of the operation object PO at predetermined intervals, according to the user's touch operation, and updates the operation object action data Dj and the item location data Dm, etc.

Next, the control unit 31 determines whether or not the action of the operation object PO set in steps S133 and S135 is to provide individual-action points (step S136). For example, if the action (in-game event) of the operation object PO set in steps S133 and S135 corresponds to one of actions (point-obtaining in-game events) for which individual-action points set for the operation objects PO are to be obtained (such actions are set for each operation object PO), the result of the determination by the control unit 31 in step S136 is positive. If the set action (in-game event) of the operation object PO is to provide individual-action points, the control unit 31 proceeds to step S137. Otherwise, i.e., if the set action (in-game event) of the operation object PO is not to provide individual-action points, the control unit 31 proceeds to step S138.

In step S137, the control unit 31 performs an action point calculation process, and proceeds to step S138. For example, according to the type of an action for which individual-action points are to be provided (point-obtaining in-game event), that has been performed by the operation object PO, the control unit 31 extracts preset individual-action points corresponding to the action for which individual-action points are to be provided (point-obtaining in-game event). The control unit 31 also adds the extracted individual-action points corresponding to the current point-obtaining action (point-obtaining in-game event) to action points indicated by the action point data Dn, and updates the action point data Dn with the action points after the addition.

In step S138, the control unit 31 performs a display control process of generating and displaying a display image on the display unit 35, and ends the subroutine. For example, the control unit 31 performs a process of generating a display image corresponding to the result of the processes in steps S132-S135, based on the item lottery data Di, the operation object action data Dj, the opponent object action data Dk, and the item location data Dm, etc., and displaying the display image on the display unit 35. If individual-action points have been extracted in step S137, the control unit 31 performs a process of generating the detection information image SI (see FIGS. 5 and 7) for notifying that an in-game event which is to provide action points has been detected in a race and the extracted individual-action points have been obtained, and displaying the detection information image SI on the display unit 35 at an appropriate position for a predetermined period of time.

Referring back to FIG. 10, after the control unit 31 determines in step S106 that a racing game is not being played, or after the racing game process in step S107, the control unit 31 determines whether or not to end a race (step S108). For example, if in a race performed by the racing game process in step S107, the operation object PO has reached a finish or has ended the race before reaching a finish due to retirement or the like, the result of the determination by the control unit 31 in step S108 is positive. If the control unit 31 determines to end the race, the control unit 31 proceeds to step S109. Otherwise, i.e., if the control unit 31 determines not to end the race, the control unit 31 proceeds to step S110.

In step S109, the control unit 31 performs a base point updating and displaying process, and proceeds to step S110. For example, the control unit 31 updates the experience value of the operation object PO (an operation character object, an operation machine object, and an operation kite object) which has participated in a race, based on the result of the race. In a non-limiting example, the control unit 31 adds a greater value (e.g., first position: +5, second position: +4, third position: +3, fourth position: +2, and fifth position and lower positions: +1) to the operation character object, the operation machine object, and the operation kite object as the operation object PO has reached a finish in a race at a higher position in standings, using experience value data in each of the operation character data De, the operation machine data Df, and the operation kite data Dg, and updates the operation character data De, the operation machine data Df, and the operation kite data Dg with the experience values after the addition. When the cumulative experience value of the operation character object, machine object, or kite object exceed a predetermined threshold, the control unit 31 adds a predetermined value (e.g., 3 is added when the cumulative value of experience value is 10) to the character points of the operation character object, the machine points of the machine object, or the kite points of the kite object that exceed the threshold, and updates the character point data Dp1, the machine point data Dp2, or the kite point data Dp3 using the value after the addition, and updates the possession data Dd corresponding to the object for which points have been added. The control unit 31 may also display a scene (e.g., reaching a finish, retiring, etc.) indicating that the operation object PO has ended a race, and generate and display, on the display unit 35, an image for notifying that the experience value and/or points have been accumulated for an object for which the experience value and/or points have been accumulated.

In step S110, the control unit 31 determines whether or not to display a game score indicating the result of the racing game. For example, if the operation data obtained in the base point updating and displaying process of step S109 indicates an operation indicating that the next game scene display is to be performed, or if a predetermined period of time has passed since the start of the base point updating and displaying process, the result of the determination by the control unit 31 in step S110 is positive. If a game score is to be displayed, the control unit 31 proceeds to step S111. Otherwise, i.e., if a game score is not to be displayed, the control unit 31 proceeds to step S112.

In step S111, the control unit 31 performs a score calculation and displaying process, and proceeds to step S112. For example, the control unit 31 calculates standing points based on the result of the ended race. In a non-limiting example, the control unit 31 sets a standing coefficient (e.g., first position: 1.0, second position: 0.8, third position: 0.6, and fourth position and lower positions: 0.4) based on a position in standings in which the operation object PO has reached a finish in a race, and updates the standing coefficient data Dq2 with the standing coefficient. The control unit 31 adds the currently calculated action points, base points, and standing points together to calculate a game score, and updates the score data Dr with the game score. Specifically, the control unit 31 adds character points indicated by the character point data Dp1, machine points indicated by the machine point data Dp2, and kite points indicated by the kite point data Dp3 together to calculate base points. The control unit 31 also multiplies the rate value indicated by the rate value data Dq1 by the standing coefficient indicated by the standing coefficient data Dq2 and the value indicating the difficulty indicated by the difficulty data Dq3 to calculate standing points. Thereafter, the control unit 31 adds the base points and the standing points to action points indicated by the action point data Dn to calculate a game score. The control unit 31 sets a reward to the user according to the game score. The control unit 31 also performs a process of generating an image (see FIG. 8) for notifying the user of the value of the game score and a detailed breakdown thereof (action points, base points, and standing points), and displaying the image on the display unit 35. The control unit 31 also performs a process of generating an image for notifying that a reward corresponding to the game score has been obtained, and displaying the image on the display unit 35.

In step S112, the control unit 31 determines whether or not to end the display of the game score. For example, if the operation data obtained in the score calculation and displaying process of step S111 indicates an operation indicating that the next game scene display is to be performed, or if a predetermined period of time has passed since the start of the score calculation and displaying process, the result of the determination by the control unit 31 in step S112 is positive. If the control unit 31 determines to end the display of the game score, the control unit 31 proceeds to step S113. Otherwise, i.e., if the control unit 31 determines not to end the display of the game score, the control unit 31 proceeds to step S115.

In step S113, the control unit 31 performs a rate value updating process, and proceeds to the next step. For example, the control unit 31 increases or decreases the rate value of the user indicated by the rate value data Dq1, based on the result of the ended race, and updates the rate value data Dq1 and the possession data Dd with the rate value after the increase or decrease. For example, the control unit 31 may increase or decrease the rate value according to a position in standings in the ended racing game and the difficulty of the ended racing game. In a non-limiting example, the control unit 31 may add a greater value after the operation object PO has reached a finish as the position in standings in the racing game is higher, or may add a greater value after the operation object PO has reached a finish as the rate value of an opponent defeated by the operation object PO is greater. If the result of the racing game is worse than a predetermined assessment standard, the control unit 31 may decrease the rate value according to the result.

Next, the control unit 31 performs a communication process (step S114), and proceeds to step S115. For example, the control unit 31 stores data indicating the result of the racing game in the transmission data Db. In a non-limiting example, the control unit 31 stores, in the transmission data Db, data indicating the operation object PO (an operation character object, an operation machine object, and an operation kite object) used in the racing game, data indicating the experience values and points (character points, machine points, and kite points) thereof, data indicating the rate value of the user, data indicating a game score, data indicating the result of the race, such as a position in standings, and other data possessed by the user (virtual currency, in-game coins, items, etc.). Thereafter, the control unit 31 transmits transmission data stored in the transmission data Db to the server 200 through the network 100. Note that character points, machine points, and kite points included in base points, and the rate value for calculating standing points, continue to be used in the next racing game no matter whether they are transmitted to the server 200. Thus, character points, machine points, kite points, and the rate value serve as a parameter that is increased or decreased based on the result of a racing game (e.g., a position in standings), and continues to be used in multiple racing games.

In step S115, the control unit 31 determines whether or not to end the game process. A condition under which the game process is ended is, for example, that a condition for ending the game process is satisfied, that an operation for ending the game process has been performed by the user, etc. If the control unit 31 continues the game process, the control unit 31 returns to and repeats step S103. If the control unit 31 determines to end the game process, the control unit 31 ends the process of the flowchart.

Thus, according to the information processing system 1 that performs the above game process, a first goal of increasing a game score (accumulating individual-action points in order to obtain a reward based on a game score) as well as a second goal of assisting in increasing a game score in the next game (increasing base points and the rate value by reaching a finish earlier) are set, and therefore, the user is motivated to achieve the goals.

In the above game process performed in the information processing system 1, the processes of updating and resetting parameters (points or the rate value) are performed. The timings at which these processes are performed are not limited to those described above. For example, while in the above game process, base points (character points, machine points, and kite points) are updated based on the result of a racing game before a game score is calculated, and the game score is calculated based on the updated base points, base points may be updated after a game score is calculated. In that case, the updated base points are used to calculate a game score in the next racing game and following racing games.

In the above game process, the rate value is updated based on the result of a racing game after a game score is calculated, and the updated rate value is used to calculate in the next racing game and following racing games. Alternatively, the rate value may be updated before a game score is calculated. In that case, the updated rate value is immediately used to calculate a game score in a racing game in which the updating has been performed.

In the above game process, action points are reset before the start of a racing game. Alternatively, action points may be reset at other timings. For example, action points may be reset after the end of a racing game (e.g., after a game score is calculated).

Action points accumulated according to an in-game event performed by an operation object PO in a race may be calculated based on the base points of the operation object PO, i.e., character points, machine points, and/or kite points. In a non-limiting example, in the above process, individual-action points that are to be provided to the operation object PO may be calculated by multiplying individual-action points obtained according to an in-game event performed by the operation object PO in a race by character points set in an operation character object included in the operation object PO.

In the foregoing, as an in-game event in a racing game or the result of a racing game is a greater achievement, action points, base points, and standing points are increased. Alternatively, as an in-game event in a racing game or the result of a racing game is a greater achievement, action points, base points, and standing points may be decreased. In that case, the above non-limiting example is applicable to a game in which a lower game score indicates a greater achievement or a game in which the result is assessed by cumulative demerit points.

In the foregoing, a racing game is used as a non-limiting example game. Alternatively, this non-limiting example is applicable to processes of executing other games and other information processes. For example, this non-limiting example is applicable to various processes, such as a process of executing a competitive game in which a user's operation object completes with another object in a sport or fight, and a process of executing a game in which only a user's operation object appears and tries to clear stages.

Note that the above game process using the information processing system 1 include the communication process between the information processing apparatus 3 and the server 200. Alternatively, the information processing apparatus 3 may perform the game process alone without connecting to the server 200. In particular, a racing game in which the user operates an operation object PO can be executed without through the server 200, and therefore, can be carried out by an internal process of the information processing apparatus 3. In addition, even in a racing game in which a plurality of information processing apparatuses 3 participate, the game process may be carried out by communication between the information processing apparatuses 3 or between the information processing apparatuses 3 and other apparatuses without through the server 200. A portion of the process of performing a racing game according to the user's operation of an operation object PO may be executed by the server 200. As a result, processes in a plurality of information processing apparatuses 3 can be managed by the server 200 in a centralized fashion.

In the foregoing, the information process and the communication process are performed in the information processing apparatus 3. Alternatively, at least a portion of the steps in the processes may be performed in another apparatus. For example, steps in the processes may be executed in cooperation with the server 200 or another apparatus (e.g., another server, another game apparatus, or another mobile terminal) that can communicate with the information processing apparatus 3. Thus, processes similar to the above processes can be performed by the server 200 or another apparatus performing a portion of the steps of the processes. The above processes may be executed by a single processor or a plurality of cooperating processors included in an information processing system including at least one information processing apparatus. In the above non-limiting example embodiment, the processes shown in the flowcharts are performed by the control unit 31 of the information processing apparatus 3 executing a predetermined program. Alternatively, all or a portion of the above processes may be performed by a dedicated circuit included in the information processing apparatus 3.

Here, according to the above non-limiting variation, this non-limiting example embodiment can be implanted in a so-called cloud computing system form or distributed wide-area and local-area network system forms. For example, in a distributed local-area network system, the above processes can be executed by cooperation between a stationary information processing apparatus (stationary game apparatus) and a mobile information processing apparatus (handheld game apparatus). Note that, in these system forms, each of the above steps may be performed by any suitable one of the apparatuses, and this non-limiting example embodiment may be implemented by assigning the steps to the apparatuses in any suitable manner.

The order of steps, setting values, conditions for determination, etc., used in the above information process are merely for illustrative purposes, and other order of steps, setting values, conditions for determination, etc., may be used to implement this non-limiting example embodiment.

The above information processing program may be supplied to the information processing apparatus 3 not only through an external storage medium, such as an external memory, but also through a wired or wireless communication line. The program may be previously stored in a non-volatile storage device in the information processing apparatus 3. Examples of an information storage medium storing the program may include non-volatile memories, and in addition, CD-ROMs, DVDs, optical disk-shaped storage media similar thereto, and flexible disks, hard disks, magneto-optical disks, magnetic tapes, etc. The information storage medium storing the program may be a volatile memory storing the program. Such a storage medium may be said as a storage medium that can be read by a computer, etc. For example, the above various functions can be provided by causing a computer, etc., to read and execute programs from these storage media.

While several non-limiting example systems, methods, devices, and apparatuses have been described above in detail, the foregoing description is in all aspects illustrative and not restrictive. It should be understood that numerous other modifications and variations can be devised without departing from the spirit and scope of the appended claims. It is, therefore, intended that the scope of the present technology is limited only by the appended claims and equivalents thereof. It should be understood that those skilled in the art could carry out the literal and equivalent scope of the appended claims based on the description of this non-limiting example embodiment and common technical knowledge. It should be understood throughout the present specification that expression of a singular form includes the concept of their plurality unless otherwise mentioned. Specifically, articles or adjectives for a singular form (e.g., "a," "an," "the," etc., in English) include the concept of their plurality unless otherwise mentioned. It should also be understood that the terms as used herein have definitions typically used in the art unless otherwise mentioned. Thus, unless otherwise defined, all scientific and technical terms have the same meanings as those generally used by those skilled in the art to which this non-limiting example embodiment pertain. If there is any inconsistency or conflict, the present specification (including the definitions) shall prevail.

As described above, the non-limiting example embodiment is useful for, for example, information processing systems, information processing programs, information processing apparatuses, and information processing methods, etc., for the purpose of enhancing a motivation for a great achievement in a game.

What is claimed is:

1. An information processing system for playing a video game a plurality of times, the information processing system comprising:
   a computer comprising instructions that, when executed by at least one hardware processor of the computer, cause the at least one hardware processor to perform operations comprising:
   processing, as part of the video game, user input provided via an input device, wherein the video game includes a racing game being played by a user;
   controlling, based on the processed user input, at least a movement direction of a virtual object within a virtual space, wherein the movement direction is controlled as part of the racing game that is being played by the user, wherein a view of the virtual object within the racing game is correspondingly output for display to a display screen;
   while the virtual object is moving through the virtual space as part of the racing game, detecting an in-game event that occurs based on input provided during the racing game;
   each time the in-game event is detected:
   outputting, to the display screen, an event score that is based on which type of in-game event has occurred;
   increasing or decreasing a first parameter based on the in-game event occurring, wherein the first parameter is reset for each time of the plurality of times that the racing game is played;
   for each of the plurality of times that the racing game is played, calculating a score;
   based on completion of the racing game for each one of the plurality of times:
   determining a reward to be given to the user based on the calculated score; and
   increasing or decreasing a second parameter based on a result of the racing game, wherein the second parameter is maintained without being reset for the racing game each one of the plurality of times that the racing game is played,
   wherein
   the score is calculated based on the first and second parameters,
   the in-game event includes an action associated with the virtual object,
   the result of the game is determined based on a standing of the virtual object within the racing game, and
   the second parameter is increased or decreased based on a base parameter corresponding to the virtual object, the base parameter being increased or decreased based on the standing.

2. The information processing system according to claim 1, wherein the increasing or decreasing the second parameter includes
when there are a plurality of the virtual objects used in the video game, increasing or decreasing a plurality of the base parameters corresponding to the plurality of virtual objects, based on the standing.

3. The information processing system according to claim 1, wherein
the increasing or decreasing the first parameter includes
when the virtual object used by the user in the video game satisfies a first increase or decrease condition, increasing the absolute value of a value by which the first parameter is to be increased or decreased based on the in-game event.

4. The information processing system according to claim 3, wherein the operations further comprise:
when the user has obtained a required number of in-game objects of the same kind, changing the in-game object so that the first increase or decrease condition is satisfied.

5. The information processing system according to claim 1, wherein
the increasing or decreasing the first parameter includes
calculating a value by which the first parameter is to be increased or decreased based on a value determined for each in-game event and a parameter corresponding to the virtual object, only during the time that a second increase or decrease condition is satisfied in the game.

6. The information processing system according to claim 5, wherein
in the increasing or decreasing the first parameter, a second increase or decrease condition is satisfied when the virtual object is combined with a particular stage of the video game.

7. The information processing system according to claim 1, wherein
in the increasing or decreasing the second parameter, a rate value that is increased or decreased according to the standing, is used as the second parameter.

8. The information processing system according to claim 7, wherein
the score is calculated based on the first parameter and a value calculated using both of the rate value and the standing.

9. The information processing system according to claim 7, wherein
the score is calculated based on the first parameter and a value corresponding to the second parameter and a difficulty value of the video game.

10. The information processing system according to claim 1, wherein
the score is calculated based on a value obtained by multiplying the second parameter by at least one of a value corresponding to the standing or a value corresponding to a difficulty of the game.

11. The information processing system according to claim 1, wherein
the racing game is a game in which an opponent appears, and
the increasing or decreasing the first parameter includes
increasing or decreasing the first parameter in response to occurrence of the in-game event in which a standing or higher standings is maintained for a period of time.

12. The information processing system according to claim 1, wherein
the racing game is a game in which an opponent appears, and
the increasing or decreasing the first parameter includes
increasing or decreasing the first parameter in response to occurrence of the in-game event in which the user obstructs the opponent.

13. The information processing system according to claim 1, wherein
the increasing or decreasing the first parameter includes
increasing or decreasing the first parameter in response to occurrence of the in-game event in which the user is put at a disadvantage in the video game.

14. The information processing system according to claim 1, wherein
the increasing or decreasing the first parameter includes
increasing or decreasing the first parameter in response to occurrence of the in-game event in which the user destroys a disposed object that is located within the virtual space.

15. The information processing system according to claim 1, wherein
an action based on the user's input is detected as the in-game event, and
the increasing or decreasing the first parameter includes
changing the amount of an increase or decrease in the first parameter, depending on the degree of an achievement of the action.

16. The information processing system according to claim 1, wherein
the increasing or decreasing the first parameter includes
increasing or decreasing the first parameter by adding, to the first parameter, a value based on a value obtained by multiplying a value determined for each in-game event by the second parameter.

17. A non-transitory computer-readable storage medium having stored therein an information processing program executable by a computer included in an apparatus for playing a video game a plurality of times, the information processing program comprising instructions that, when executed by at least one hardware processor of the computer, cause the at least one hardware processor to perform operations comprising:
processing, as part of the video game, user input provided via an input device, wherein the video game includes a racing game being played by a user;
controlling, based on the processed user input, at least a movement direction of a virtual object within a virtual space, wherein the movement direction is controlled as part of the racing game that is being played by the user, wherein a view of the virtual object within the racing game is correspondingly output for display to a display screen;
while the virtual object is moving through the virtual space as part of the racing game, detecting an in-game event that occurs based on input provided during the racing game;
each time the in-game event is detected:
outputting, to the display screen, an event score that is based on which type of in-game event has occurred;
increasing or decreasing a first parameter based on the in-game event occurring, wherein the first parameter is reset for each time of the plurality of times that the racing game is played;
for each of the plurality of times that the racing game is played, calculating a score;
based on completion of the racing game for each one of the plurality of times:

determining a reward to be given to the user based on the calculated score; and increasing or decreasing a second parameter based on a result of the racing game, wherein the second parameter is maintained without being reset for the racing game each one of the plurality of times that the racing game is played, wherein the score is calculated based on the first and second parameters, the in-game event includes an action associated with the virtual object, the result of the game is determined based on a standing of the virtual object within the racing game, and the second parameter is increased or decreased based on a base parameter corresponding to the virtual object, the base parameter being increased or decreased based on the standing.

18. An information processing apparatus for playing a video game a plurality of times, the information processing apparatus comprising:

a computer comprising instructions that, when executed by at least one hardware processor of the computer, cause the at least one hardware processor to perform operations comprising:

processing, as part of the video game, user input provided via an input device, wherein the video game includes a racing game being played by a user;

controlling, based on the processed user input, at least a movement direction of a virtual object within a virtual space, wherein the movement direction is controlled as part of the racing game that is being played by the user, wherein a view of the virtual object within the racing game is correspondingly output for display to a display screen;

while the virtual object is moving through the virtual space as part of the racing game, detecting an in-game event that occurs based on input provided during the racing game;

each time the in-game event is detected:

outputting, to the display screen, an event score that is based on which type of in-game event has occurred;

increasing or decreasing a first parameter based on the in-game event occurring, wherein the first parameter is reset for each time of the plurality of times that the racing game is played;

for each of the plurality of times that the racing game is played, calculating a score;

based on completion of the racing game for each one of the plurality of times:

determining a reward to be given to the user based on the calculated score; and increasing or decreasing a second parameter based on a result of the racing game, wherein the second parameter is maintained without being reset for the racing game each one of the plurality of times that the racing game is played, wherein the score is calculated based on the first and second parameters, the in-game event includes an action associated with the virtual object, the result of the game is determined based on a standing of the virtual object within the racing game, and the second parameter is increased or decreased based on a base parameter corresponding to the virtual object, the base parameter being increased or decreased based on the standing.

19. An information processing method playing a video game a plurality of times, the method comprising:

executing, by using a computing device, an application program for the video game;

processing, as part of the video game, user input provided via an input device, wherein the video game includes a racing game being played by a user;

controlling, based on the processed user input, at least a movement direction of a virtual object within a virtual space, wherein the movement direction is controlled as part of the racing game that is being played by the user, wherein a view of the virtual object within the racing game is correspondingly output for display to a display screen;

while the virtual object is moving through the virtual space as part of the racing game, detecting an in-game event that occurs based on input provided during the racing game;

each time the in-game event is detected:

outputting, to the display screen, an event score that is based on which type of in-game event has occurred;

increasing or decreasing a first parameter based on the in-game event occurring, wherein the first parameter is reset for each time of the plurality of times that the racing game is played;

for each of the plurality of times that the racing game is played, calculating a score;

based on completion of the racing game for each one of the plurality of times:

determining a reward to be given to the user based on the calculated score; and increasing or decreasing a second parameter based on a result of the racing game, wherein the second parameter is maintained without being reset for the racing game each one of the plurality of times that the racing game is played, wherein the score is calculated based on the first and second parameters, the in-game event includes an action associated with the virtual object, the result of the game is determined based on a standing of the virtual object within the racing game, and the second parameter is increased or decreased based on a base parameter corresponding to the virtual object, the base parameter being increased or decreased based on the standing.

* * * * *